US011016858B2

(12) United States Patent
Kottomtharayil et al.

(10) Patent No.: US 11,016,858 B2
(45) Date of Patent: May 25, 2021

(54) SYSTEMS AND METHODS FOR MANAGING SINGLE INSTANCING DATA

(71) Applicant: CommVault Systems, Inc., Tinton Falls, NJ (US)

(72) Inventors: Rajiv Kottomtharayil, Marlboro, NJ (US); Deepak Raghunath Attarde, Marlboro, NJ (US); Manoj Kumar Vijayan, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 299 days.

(21) Appl. No.: 14/674,229

(22) Filed: Mar. 31, 2015

(65) Prior Publication Data

US 2015/0205678 A1 Jul. 23, 2015

Related U.S. Application Data

(63) Continuation of application No. 12/565,576, filed on Sep. 23, 2009, now Pat. No. 9,015,181.

(Continued)

(51) Int. Cl.
*G06F 11/14* (2006.01)
*G06F 16/174* (2019.01)

(52) U.S. Cl.
CPC ...... *G06F 11/1453* (2013.01); *G06F 11/1451* (2013.01); *G06F 11/1464* (2013.01); *G06F 16/1744* (2019.01); *G06F 11/1458* (2013.01)

(58) Field of Classification Search
CPC ........... G06F 17/30312; G06F 16/1744; G06F 11/1453

(Continued)

(56) References Cited

U.S. PATENT DOCUMENTS 4,686,620 A 8/1987 Ng
4,713,755 A 12/1987 Worley, Jr. et al.
(Continued)

FOREIGN PATENT DOCUMENTS

EP 0259912 A1 3/1988
EP 0405926 A2 1/1991
(Continued)

OTHER PUBLICATIONS

Extended European Search Report for 09816825.5; dated Oct. 27, 2015, 15 pages.
(Continued)

*Primary Examiner* — Eliyah S. Harper
(74) *Attorney, Agent, or Firm* — Commvault Systems, Inc.

(57) ABSTRACT

Described in detail herein are systems and methods for managing single instancing data. Using a single instance database and other constructs (e.g. sparse files), data density on archival media (e.g. magnetic tape) is improved, and the number of files per storage operation is reduced. According to one aspect of a method for managing single instancing data, for each storage operation, a chunk folder is created on a storage device that stores single instancing data. The chunk folder contains three files: 1) a file that contains data objects that have been single instanced; 2) a file that contains data objects that have not been eligible for single instancing; and 3) a metadata file used to track the location of data objects within the other files. A second storage operation subsequent to a first storage operation contains references to data objects in the chunk folder created by the first storage operation instead of the data objects themselves.

13 Claims, 15 Drawing Sheets

Related U.S. Application Data

(60) Provisional application No. 61/100,686, filed on Sep. 26, 2008.

(58) Field of Classification Search
USPC .................................................. 707/661, 705
See application file for complete search history.

(56) References Cited

U.S. PATENT DOCUMENTS

| | | |
|---|---|---|
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,437,012 A | 7/1995 | Mahajan |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,604,862 A | 2/1997 | Midgely et al. |
| 5,606,686 A | 2/1997 | Tarui et al. |
| 5,619,644 A | 4/1997 | Crockett et al. |
| 5,628,004 A | 5/1997 | Gormley et al. |
| 5,634,052 A | 5/1997 | Morris |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,742,792 A | 4/1998 | Yanai et al. |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,794,229 A | 8/1998 | French et al. |
| 5,806,057 A | 9/1998 | Gormley et al. |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,822,780 A | 10/1998 | Schutzman |
| 5,842,222 A * | 11/1998 | Lin ..................... G06F 16/2358 707/646 |
| 5,862,325 A | 1/1999 | Reed et al. |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,940,833 A | 8/1999 | Benson |
| 5,950,205 A | 9/1999 | Aviani, Jr. |
| 5,974,563 A | 10/1999 | Beeler, Jr. |
| 5,990,810 A | 11/1999 | Williams |
| 6,021,415 A | 2/2000 | Cannon et al. |
| 6,026,414 A | 2/2000 | Anglin |
| 6,052,735 A | 4/2000 | Ulrich et al. |
| 6,073,133 A | 6/2000 | Chrabaszcz |
| 6,076,148 A | 6/2000 | Kedem |
| 6,094,416 A | 7/2000 | Ying |
| 6,125,369 A | 9/2000 | Wu et al. |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,311,252 B1 | 10/2001 | Raz |
| 6,324,544 B1 | 11/2001 | Alam et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,477,544 B1 * | 11/2002 | Bolosky ............... G06F 16/174 |
| 6,487,561 B1 | 11/2002 | Ofek et al. |
| 6,513,051 B1 | 1/2003 | Bolosky et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,609,157 B2 | 8/2003 | Deo et al. |
| 6,609,183 B2 | 8/2003 | Ohran |
| 6,609,187 B1 | 8/2003 | Merrell et al. |
| 6,658,526 B2 | 12/2003 | Nguyen et al. |
| 6,675,177 B1 | 1/2004 | Webb |
| 6,704,730 B2 | 3/2004 | Moulton et al. |
| 6,708,195 B1 * | 3/2004 | Borman ..................... G06F 9/52 707/999.008 |
| 6,745,304 B2 | 6/2004 | Playe |
| 6,757,699 B2 | 6/2004 | Lowry |
| 6,757,794 B2 | 6/2004 | Cabrera et al. |
| 6,795,903 B2 | 9/2004 | Schultz et al. |
| 6,810,398 B2 | 10/2004 | Moulton |
| 6,862,674 B2 | 3/2005 | Dice et al. |
| 6,865,655 B1 | 3/2005 | Andersen |
| 6,868,417 B2 | 3/2005 | Kazar et al. |
| 6,889,297 B2 | 5/2005 | Krapp et al. |
| 6,901,493 B1 | 5/2005 | Maffezzoni |
| 6,912,645 B2 | 6/2005 | Dorward et al. |
| 6,928,459 B1 | 8/2005 | Sawdon et al. |
| 6,952,758 B2 | 10/2005 | Chron et al. |
| 6,959,368 B1 | 10/2005 | St. Pierre et al. |
| 6,973,553 B1 | 12/2005 | Archibald, Jr. et al. |
| 6,976,039 B2 | 12/2005 | Chefalas et al. |
| 6,993,162 B2 | 1/2006 | Stephany et al. |
| 7,017,113 B2 | 3/2006 | Bourbakis et al. |
| 7,035,876 B2 | 4/2006 | Kawai et al. |
| 7,035,880 B1 | 4/2006 | Crescenti et al. |
| 7,035,943 B2 | 4/2006 | Yamane et al. |
| 7,085,904 B2 | 8/2006 | Mizuno et al. |
| 7,089,383 B2 | 8/2006 | Ji et al. |
| 7,089,395 B2 | 8/2006 | Jacobson et al. |
| 7,092,956 B2 | 8/2006 | Ruediger |
| 7,103,740 B2 | 9/2006 | Colgrove et al. |
| 7,107,418 B2 | 9/2006 | Ohran |
| 7,111,173 B1 | 9/2006 | Scheidt |
| 7,117,246 B2 | 10/2006 | Christenson et al. |
| 7,139,808 B2 | 11/2006 | Anderson et al. |
| 7,143,091 B2 | 11/2006 | Charnock et al. |
| 7,143,108 B1 * | 11/2006 | George ............ G06F 17/30595 |
| 7,191,290 B1 | 3/2007 | Ackaouy et al. |
| 7,200,604 B2 | 4/2007 | Forman et al. |
| 7,200,621 B2 | 4/2007 | Beck et al. |
| 7,246,272 B2 | 7/2007 | Cabezas et al. |
| 7,272,606 B2 | 9/2007 | Borthakur et al. |
| 7,287,252 B2 | 10/2007 | Bussiere et al. |
| 7,290,102 B2 | 10/2007 | Lubbers et al. |
| 7,310,655 B2 | 12/2007 | Dussud |
| 7,320,059 B1 | 1/2008 | Armangau et al. |
| 7,325,110 B2 | 1/2008 | Kubo et al. |
| 7,330,997 B1 | 2/2008 | Odom |

(56) References Cited

U.S. PATENT DOCUMENTS

| | | |
|---|---|---|
| 7,343,459 B2 | 3/2008 | Prahlad et al. |
| 7,370,003 B2 | 5/2008 | Pych |
| 7,376,805 B2 | 5/2008 | Stroberger et al. |
| 7,383,304 B2 | 6/2008 | Shimada et al. |
| 7,383,462 B2 | 6/2008 | Osaki et al. |
| 7,389,345 B1 | 6/2008 | Adams |
| 7,395,282 B1 | 7/2008 | Crescenti et al. |
| 7,409,522 B1 | 8/2008 | Fair et al. |
| 7,444,382 B2 | 10/2008 | Malik |
| 7,444,387 B2 | 10/2008 | Douceur et al. |
| 7,478,113 B1 | 1/2009 | De Spiegeleer et al. |
| 7,480,782 B2 | 1/2009 | Garthwaite |
| 7,487,245 B2 | 2/2009 | Douceur et al. |
| 7,490,207 B2 | 2/2009 | Amarendran et al. |
| 7,493,314 B2 | 2/2009 | Huang et al. |
| 7,493,456 B2 | 2/2009 | Brittain et al. |
| 7,496,604 B2 | 2/2009 | Sutton, Jr. et al. |
| 7,512,745 B2 | 3/2009 | Gschwind et al. |
| 7,519,726 B2 | 4/2009 | Palliyil et al. |
| 7,533,331 B2 | 5/2009 | Brown et al. |
| 7,536,440 B2 | 5/2009 | Budd et al. |
| 7,546,428 B1 * | 6/2009 | McAndrews ....... G06F 11/1456 707/999.202 |
| 7,568,080 B2 | 7/2009 | Prahlad et al. |
| 7,577,687 B2 | 8/2009 | Bank et al. |
| 7,603,529 B1 | 10/2009 | MacHardy et al. |
| 7,613,748 B2 | 11/2009 | Brockway et al. |
| 7,617,297 B2 | 11/2009 | Bruce et al. |
| 7,631,120 B2 | 12/2009 | Darcy |
| 7,631,194 B2 | 12/2009 | Wahlert et al. |
| 7,636,824 B1 | 12/2009 | Tormasov |
| 7,647,462 B2 | 1/2010 | Wolfgang et al. |
| 7,657,550 B2 | 2/2010 | Prahlad et al. |
| 7,661,028 B2 | 2/2010 | Erofeev |
| 7,668,884 B2 | 2/2010 | Prahlad et al. |
| 7,672,779 B2 | 3/2010 | Fuchs |
| 7,672,981 B1 | 3/2010 | Faibish et al. |
| 7,676,590 B2 | 3/2010 | Silverman et al. |
| 7,685,126 B2 | 3/2010 | Patel et al. |
| 7,685,177 B1 | 3/2010 | Hagerstrom et al. |
| 7,685,384 B2 | 3/2010 | Shavit |
| 7,685,459 B1 | 3/2010 | De Spiegeleer et al. |
| 7,698,699 B2 | 4/2010 | Rogers et al. |
| 7,721,292 B2 | 5/2010 | Frasier et al. |
| 7,734,581 B2 | 6/2010 | Gu et al. |
| 7,747,579 B2 | 6/2010 | Prahlad et al. |
| 7,747,659 B2 | 6/2010 | Bacon et al. |
| 7,778,979 B2 | 8/2010 | Hatonen et al. |
| 7,786,881 B2 | 8/2010 | Burchard et al. |
| 7,788,230 B2 | 8/2010 | Dile et al. |
| 7,814,142 B2 | 10/2010 | Mamou et al. |
| 7,818,287 B2 | 10/2010 | Torii et al. |
| 7,818,495 B2 | 10/2010 | Tanaka et al. |
| 7,818,531 B2 | 10/2010 | Barrall |
| 7,831,707 B2 | 11/2010 | Bardsley |
| 7,831,795 B2 | 11/2010 | Prahlad et al. |
| 7,836,161 B2 | 11/2010 | Scheid |
| 7,840,537 B2 | 11/2010 | Gokhale et al. |
| 7,853,750 B2 | 12/2010 | Stager |
| 7,856,414 B2 | 12/2010 | Zee |
| 7,865,678 B2 | 1/2011 | Arakawa et al. |
| 7,870,105 B2 | 1/2011 | Arakawa et al. |
| 7,870,486 B2 | 1/2011 | Wang et al. |
| 7,873,599 B2 | 1/2011 | Ishii et al. |
| 7,873,806 B2 | 1/2011 | Prahlad et al. |
| 7,882,077 B2 | 2/2011 | Gokhale et al. |
| 7,899,990 B2 | 3/2011 | Moll et al. |
| 7,921,077 B2 | 4/2011 | Ting et al. |
| 7,953,706 B2 | 5/2011 | Prahlad et al. |
| 7,962,452 B2 | 6/2011 | Anglin |
| 8,028,106 B2 | 9/2011 | Bondurant et al. |
| 8,037,028 B2 | 10/2011 | Prahlad et al. |
| 8,041,907 B1 | 10/2011 | Wu et al. |
| 8,051,367 B2 | 11/2011 | Arai et al. |
| 8,054,765 B2 | 11/2011 | Passey et al. |
| 8,055,618 B2 | 11/2011 | Anglin |
| 8,055,627 B2 | 11/2011 | Prahlad et al. |
| 8,055,745 B2 | 11/2011 | Atluri |
| 8,086,799 B2 | 12/2011 | Mondal et al. |
| 8,108,429 B2 | 1/2012 | Sim-Tang et al. |
| 8,112,357 B2 | 2/2012 | Mueller et al. |
| 8,131,687 B2 | 3/2012 | Bates et al. |
| 8,140,786 B2 | 3/2012 | Bunte et al. |
| 8,156,092 B2 | 4/2012 | Hewett et al. |
| 8,156,279 B2 | 4/2012 | Tanaka et al. |
| 8,161,003 B2 | 4/2012 | Kavuri |
| 8,165,221 B2 | 4/2012 | Zheng et al. |
| 8,166,263 B2 | 4/2012 | Prahlad et al. |
| 8,170,994 B2 | 5/2012 | Tsaur et al. |
| 8,190,823 B2 | 5/2012 | Waltermann et al. |
| 8,190,835 B1 | 5/2012 | Yueh |
| 8,219,524 B2 | 7/2012 | Gokhale |
| 8,234,444 B2 | 7/2012 | Bates et al. |
| 8,271,992 B2 | 9/2012 | Chatley et al. |
| 8,285,683 B2 | 10/2012 | Prahlad et al. |
| 8,295,875 B2 | 10/2012 | Masuda |
| 8,296,260 B2 | 10/2012 | Ting et al. |
| 8,315,984 B2 | 11/2012 | Frandzel |
| 8,346,730 B2 | 1/2013 | Srinivasan et al. |
| 8,375,008 B1 | 2/2013 | Gomes |
| 8,380,957 B2 | 2/2013 | Prahlad et al. |
| 8,392,677 B2 | 3/2013 | Bunte et al. |
| 8,401,996 B2 | 3/2013 | Muller et al. |
| 8,412,677 B2 | 4/2013 | Klose |
| 8,412,682 B2 | 4/2013 | Zheng et al. |
| 8,548,953 B2 | 10/2013 | Wong et al. |
| 8,578,120 B2 | 11/2013 | Attarde et al. |
| 8,620,845 B2 | 12/2013 | Stoakes et al. |
| 8,626,723 B2 | 1/2014 | Ben-Shaul et al. |
| 8,712,969 B2 | 4/2014 | Prahlad et al. |
| 8,712,974 B2 | 4/2014 | Datuashvili et al. |
| 8,725,687 B2 | 5/2014 | Klose |
| 8,769,185 B2 | 7/2014 | Chung |
| 8,782,368 B2 | 7/2014 | Lillibridge et al. |
| 8,880,797 B2 | 11/2014 | Yueh |
| 8,909,881 B2 | 12/2014 | Bunte et al. |
| 8,935,492 B2 | 1/2015 | Gokhale et al. |
| 8,965,852 B2 | 2/2015 | Jayaraman |
| 9,015,181 B2 | 4/2015 | Kottomtharayil et al. |
| 9,058,117 B2 | 6/2015 | Attarde et al. |
| 9,098,495 B2 | 8/2015 | Gokhale |
| 10,089,337 B2 | 10/2018 | Senthilnathan et al. |
| 10,262,003 B2 * | 4/2019 | Kottomtharayil ..... G06F 1/3234 |
| 10,324,897 B2 | 6/2019 | Amarendran et al. |
| 10,324,914 B2 * | 6/2019 | Kumarasamy ........ G06F 16/182 |
| 10,678,758 B2 | 6/2020 | Dornemann |
| 2001/0037323 A1 | 11/2001 | Moulton et al. |
| 2002/0055972 A1 | 5/2002 | Weinman |
| 2002/0065892 A1 | 5/2002 | Malik |
| 2002/0099806 A1 | 7/2002 | Balsamo et al. |
| 2002/0107877 A1 | 8/2002 | Whiting et al. |
| 2002/0169934 A1 | 11/2002 | Krapp et al. |
| 2003/0004922 A1 | 1/2003 | Schmidt et al. |
| 2003/0033308 A1 | 2/2003 | Patel et al. |
| 2003/0097359 A1 | 5/2003 | Ruediger |
| 2003/0105716 A1 | 6/2003 | Sutton et al. |
| 2003/0110190 A1 | 6/2003 | Achiwa et al. |
| 2003/0135704 A1 | 7/2003 | Martin |
| 2003/0167318 A1 | 9/2003 | Robbin et al. |
| 2003/0172368 A1 | 9/2003 | Alumbaugh et al. |
| 2003/0177149 A1 | 9/2003 | Coombs |
| 2003/0191849 A1 * | 10/2003 | Leong .................. G06F 16/113 709/229 |
| 2003/0236763 A1 | 12/2003 | Kilduff |
| 2004/0006702 A1 * | 1/2004 | Johnson ................ G06F 3/0622 713/189 |
| 2004/0093259 A1 | 5/2004 | Pych |
| 2004/0148306 A1 | 7/2004 | Moulton et al. |
| 2004/0167898 A1 | 8/2004 | Margolus et al. |
| 2004/0230817 A1 | 11/2004 | Ma |
| 2005/0033756 A1 | 2/2005 | Kottomtharayil et al. |
| 2005/0055359 A1 | 3/2005 | Kawai et al. |
| 2005/0060643 A1 | 3/2005 | Glass et al. |
| 2005/0066190 A1 | 3/2005 | Martin |

(56) References Cited

U.S. PATENT DOCUMENTS

| | | |
|---|---|---|
| 2005/0097150 A1 | 5/2005 | McKeon et al. |
| 2005/0114406 A1 | 5/2005 | Borthakur et al. |
| 2005/0138081 A1 | 6/2005 | Alshab et al. |
| 2005/0149589 A1 | 7/2005 | Bacon et al. |
| 2005/0177603 A1 | 8/2005 | Shavit |
| 2005/0193028 A1* | 9/2005 | Oswalt .................. G06F 16/273 |
| 2005/0203864 A1 | 9/2005 | Schmidt et al. |
| 2005/0234823 A1 | 10/2005 | Schimpf |
| 2005/0262110 A1 | 11/2005 | Gu et al. |
| 2005/0262193 A1 | 11/2005 | Mamou et al. |
| 2005/0286466 A1 | 12/2005 | Tagg et al. |
| 2006/0005048 A1 | 1/2006 | Osaki et al. |
| 2006/0010227 A1 | 1/2006 | Atluri |
| 2006/0047894 A1 | 3/2006 | Okumura |
| 2006/0053305 A1 | 3/2006 | Wahlert et al. |
| 2006/0056623 A1 | 3/2006 | Gligor et al. |
| 2006/0089954 A1 | 4/2006 | Anschutz |
| 2006/0095470 A1 | 5/2006 | Cochran et al. |
| 2006/0123313 A1 | 6/2006 | Brown et al. |
| 2006/0129875 A1 | 6/2006 | Barrall |
| 2006/0156064 A1 | 7/2006 | Damani et al. |
| 2006/0174112 A1 | 8/2006 | Wray |
| 2006/0224846 A1 | 10/2006 | Amarendran et al. |
| 2006/0230244 A1 | 10/2006 | Amarendran et al. |
| 2007/0022145 A1 | 1/2007 | Kavuri |
| 2007/0118573 A1* | 5/2007 | Gadiraju ........... G06F 17/30339 |
| 2007/0118705 A1 | 5/2007 | Arakawa et al. |
| 2007/0136200 A1 | 6/2007 | Frank et al. |
| 2007/0156998 A1 | 7/2007 | Gorobets |
| 2007/0179995 A1 | 8/2007 | Prahlad et al. |
| 2007/0185879 A1* | 8/2007 | Roublev ............... G06F 16/113 |
| 2007/0208788 A1 | 9/2007 | Chakravarty et al. |
| 2007/0255758 A1 | 11/2007 | Zheng et al. |
| 2007/0255909 A1 | 11/2007 | Gschwind et al. |
| 2007/0271316 A1 | 11/2007 | Hollebeek |
| 2008/0005141 A1 | 1/2008 | Zheng et al. |
| 2008/0016467 A1 | 1/2008 | Chambers et al. |
| 2008/0028007 A1 | 1/2008 | Ishii et al. |
| 2008/0034045 A1 | 2/2008 | Bardsley |
| 2008/0082736 A1 | 4/2008 | Chow et al. |
| 2008/0091881 A1 | 4/2008 | Brittain et al. |
| 2008/0098083 A1 | 4/2008 | Shergill et al. |
| 2008/0125170 A1 | 5/2008 | Masuda |
| 2008/0162320 A1 | 7/2008 | Mueller et al. |
| 2008/0162467 A1 | 7/2008 | Fuchs |
| 2008/0162518 A1 | 7/2008 | Bollinger et al. |
| 2008/0184001 A1 | 7/2008 | Stager |
| 2008/0243879 A1 | 10/2008 | Gokhale et al. |
| 2008/0243914 A1 | 10/2008 | Prahlad et al. |
| 2008/0243957 A1 | 10/2008 | Prahlad et al. |
| 2008/0243958 A1 | 10/2008 | Prahlad et al. |
| 2008/0244204 A1 | 10/2008 | Cremelie et al. |
| 2008/0294696 A1 | 11/2008 | Frandzel |
| 2009/0012984 A1 | 1/2009 | Ravid et al. |
| 2009/0013140 A1 | 1/2009 | Bondurant et al. |
| 2009/0049260 A1 | 2/2009 | Upadhyayula |
| 2009/0063528 A1 | 3/2009 | Yueh |
| 2009/0083341 A1* | 3/2009 | Parees ............... G06F 17/30371 |
| 2009/0083344 A1 | 3/2009 | Inoue et al. |
| 2009/0083610 A1 | 3/2009 | Arai et al. |
| 2009/0106369 A1 | 4/2009 | Chen et al. |
| 2009/0106480 A1 | 4/2009 | Chuna |
| 2009/0112870 A1 | 4/2009 | Ozzie et al. |
| 2009/0132619 A1 | 5/2009 | Arakawa et al. |
| 2009/0132764 A1 | 5/2009 | Moll et al. |
| 2009/0144285 A1 | 6/2009 | Chatley et al. |
| 2009/0150498 A1 | 6/2009 | Branda et al. |
| 2009/0192978 A1 | 7/2009 | Hewett et al. |
| 2009/0204636 A1 | 8/2009 | Li et al. |
| 2009/0204649 A1 | 8/2009 | Wono et al. |
| 2009/0235022 A1 | 9/2009 | Bates et al. |
| 2009/0268903 A1 | 10/2009 | Bojinov et al. |
| 2009/0271402 A1 | 10/2009 | Srinivasan et al. |
| 2009/0271454 A1 | 10/2009 | Anglin et al. |
| 2009/0319534 A1 | 12/2009 | Gokhale |
| 2010/0036887 A1 | 2/2010 | Anglin et al. |
| 2010/0070715 A1 | 3/2010 | Waltermann et al. |
| 2010/0077161 A1 | 3/2010 | Stoakes et al. |
| 2010/0082529 A1 | 4/2010 | Mace et al. |
| 2010/0082672 A1 | 4/2010 | Kottomtharayil et al. |
| 2010/0088296 A1 | 4/2010 | Periyagaram et al. |
| 2010/0094817 A1 | 4/2010 | Ben-Shaul et al. |
| 2010/0161554 A1 | 6/2010 | Datuashvili et al. |
| 2010/0223441 A1 | 9/2010 | Lillibridge et al. |
| 2011/0035357 A1 | 2/2011 | Ting et al. |
| 2011/0125720 A1 | 5/2011 | Jayaraman |
| 2012/0271793 A1 | 10/2012 | Gokhale |
| 2013/0218842 A1 | 8/2013 | Muller et al. |
| 2013/0262386 A1 | 10/2013 | Kottomtharayil et al. |
| 2014/0188805 A1 | 7/2014 | Vijayan |
| 2014/0233366 A1 | 8/2014 | Prahlad et al. |
| 2014/0250088 A1 | 9/2014 | Klose |
| 2015/0134924 A1 | 5/2015 | Gokhale et al. |
| 2015/0199242 A1* | 7/2015 | Attarde .................. G06F 3/064 |
| | | 711/162 |
| 2019/0188188 A1 | 6/2019 | Kottomtharayil et al. |
| 2019/0192978 A1 | 6/2019 | Eatedali et al. |
| 2019/0266139 A1 | 8/2019 | Kumarasamy et al. |
| 2019/0278748 A1* | 9/2019 | Amarendran ....... G06F 11/2094 |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0981090 A1 | 2/2000 |
| WO | WO-9513580 A1 | 5/1995 |
| WO | WO-9912098 A1 | 3/1999 |
| WO | WO-03027891 A1 | 4/2003 |
| WO | WO-2006052872 A2 | 5/2006 |
| WO | 2008070688 A1 | 6/2008 |
| WO | 2008080140 A2 | 7/2008 |

OTHER PUBLICATIONS

Australian Examination Report dated Feb. 14, 2012 for Australian Application No. 2009296695 in 3 pages.
Australian Examination Report dated Jun. 7, 2013 for Australian Application No. 2009296695 in 3 pages.
Australian Examination Report dated Sep. 12, 2013 for Australian Application No. 2009296695 in 6 pages.
Australian Examination Report dated Oct. 2, 2014 for Australian Application No. 2013206404 in 2 pages.
Canadian Examination Report dated Nov. 7, 2014 for Canadian Application No. 2729078 in 5 pages.
Partial Supplementary European Search Report dated Apr. 15, 2015 for European Application No. 09816825.5 in 6 pages.
European Examination Report dated Jan. 13, 2020 for European Application No. 09816825.5 in 7 pages.
Armstead et al., "Implementation of a Campwide Distributed Mass Storage Service: The Dream vs. Reality," IEEE, Sep. 11-14, 1995, pp. 190-199.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Commvault Systems, Inc., "Continuous Data Replicator 7.0," Product Data Sheet, 2007, 6 pages.
CommVault Systems, Inc., "Deduplication—How To,"; <http://documentation.commvault.com/commvault/release_8_0_0/books_online_1/english_US;/features/single_instance/single_instance_how_to.htm>, earliest known publication date:; Jan. 26, 2009, 7 pages.
CommVault Systems, Inc., "Deduplication,"; <http://documentation.commvault.com/commvault/release_8_0_0/books_online_1/english_

(56) References Cited

OTHER PUBLICATIONS

US;/features/single_instance/single_instance.htm>, earliest known publication date: Jan. 26, 2009, 9; pages.
Diligent Technologies "HyperFactor," <http://www.diligent.com/products:protecTIER-1:HyperFactor-1>, Internet accessed on Dec. 5, 2008, 2 pages.
Eitel, "Backup and Storage Management in Distributed Heterogeneous Environments," *IEEE*, Jun. 12-16, 1994, pp. 124-126.
Enterprise Storage Management, "What Is Hierarchical Storage Management?", Jun. 19, 2005, pp. 1, http://web.archive.org/web/20050619000521/hhttp://www.enterprisestoragemanagement.com/faq/hierarchical-storage-management-shtml.
Enterprise Storage Management, What Is a Incremental Backup?, Oct. 26, 2005, pp. 1-2, http://web.archive.org/web/w0051026010908/http://www.enterprisestoragemanagement.com/faq/incremental-backup.shtml.
Extended European Search Report for EP07865192.4; dated May 2, 2013, 7 pages.
Federal Information Processing Standards Publication 180-2, "Secure Hash Standard", Aug. 1, 2002, ; <http://csrc.nist.gov/publications/fips/fips1 80-2/fips 1 80-2withchangenotice. pdf>, 83 pages.
Gait, J., "The Optical File Cabinet: A Random-Access File System for Write-Once Optical Disks," *IEEE Computer*, vol. 21, No. 6, pp. 11-22 (Jun. 1988).
Geer, D., "Reducing the Storage Burden Via Data Deduplication," IEEE, Computer Journal, vol. 41, Issue 12, Dec. 2008, pp. 15-17.
Handy, Jim, "The Cache Memory Book: The Authoritative Reference on Cache Design," Second Edition, 1998, pp. 64-67 and pp. 204-205.
International Search Report and Written Opinion for PCT/US07/86421, dated Apr. 18, 2008, 9 pages.
International Search Report for Application No. PCT/US09/58137, dated Dec. 23, 2009, 14 pages.
International Search Report for Application No. PCT/US10/34676, dated Nov. 29, 2010, 9 pages.
International Search Report for Application No. PCT/US11/54378, dated May 2, 2012, 8 pages.
Jander, M., "Launching Storage-Area Net," *Data Communications*, US, McGraw Hill, NY, vol. 27, No. 4 (Mar. 21, 1998), pp. 64-72.
Kornblum, Jesse, "Identifying Almost Identical Files Using Context Triggered Piecewise Hashing," www.sciencedirect.com, Digital Investigation 3S (2006), pp. S91-S97.
Kulkarni P. et al., "Redundancy elinination within large collections of files," Proceedings of the Usenix Annual Technical Conference, Jul. 2, 2004, pp. 59-72.
Lortu Software Development, "Kondar Technology-Deduplication," <http://www.lortu.com/en/deduplication.asp>, Internet accessed on Dec. 5, 2008, 3 pages.
Menezes et al., "Handbook of Applied Cryptography", CRC Press, 1996, <http://www.cacr.math.uwaterloo.ca/hac/aboutlchap9.pdf>, 64 pages.
Microsoft, "Computer Dictionary", p. 249, Fifth Edition, 2002, 3 pages.
Microsoft, "Computer Dictionary", pp. 142, 150, 192, and 538, Fifth Edition, 2002, 6 pages.
Overland Storage, "Data Deduplication," <http://www.overlandstorage.com/topics/data_deduplication.html>, Internet accessed on Dec. 5, 2008, 2 pages.
Partial Supplementary European Search Report in Application No. 09816825.5, dated Apr. 15, 2015, 6 pages.
Quantum Corporation, "Data De-Duplication Background: A Technical White Paper," May 2008, 13 pages.
Rosenblum et al., "The Design and Implementation of a Log-Structured File System," *Operating Systems Review SIGOPS*, vol. 25, No. 5, New York, US, pp. 1-15 (May 1991).
SearchStorage, "File System", Nov. 1998, <http://searchstorage.techtarget.com/definition/file-system>, 10 pages.
Sharif, A., "Cache Memory," Sep. 2005, http://searchstorage.techtarget.com/definition/cache-memory, pp. 1-26.
Webopedia, "Cache," Apr. 11, 2001, http://web.archive.org/web/20010411033304/http://www.webopedia.com/TERM/c/cache.html pp. 1-4.
Webopedia, "Data Duplication", Aug. 31, 2006, <http://web.archive.org/web/20060913030559/http://www.webopedia.com/TERMID/data_deduplication.html>, 2 pages.
Examination Report dated Dec. 14, 2018 in European Patent Application No. 09816825.5, 7 pages.
U.S. Appl. No. 12/565,576, filed Sep. 23, 2009, now U.S. Pat. No. 9,015,181, titled Systems and Methods for Managing Single Instancing Data.
U.S. Appl. No. 12/647,906, filed Dec. 28, 2009, now U.S. Pat. No. 8,578,120, titled Block-Level Single Instancing.
U.S. Appl. No. 14/049,463, filed Oct. 9, 2013, now U.S. Pat. No. 9,058,117, titled Block-Level Single Instancing.
U.S. Appl. No. 14/668,450, filed Mar. 5, 2015, titled Block-Level Single Instancing.
Canada Office Action for Application No. 2706007, dated Jul. 30, 2014, 2 pages.

* cited by examiner

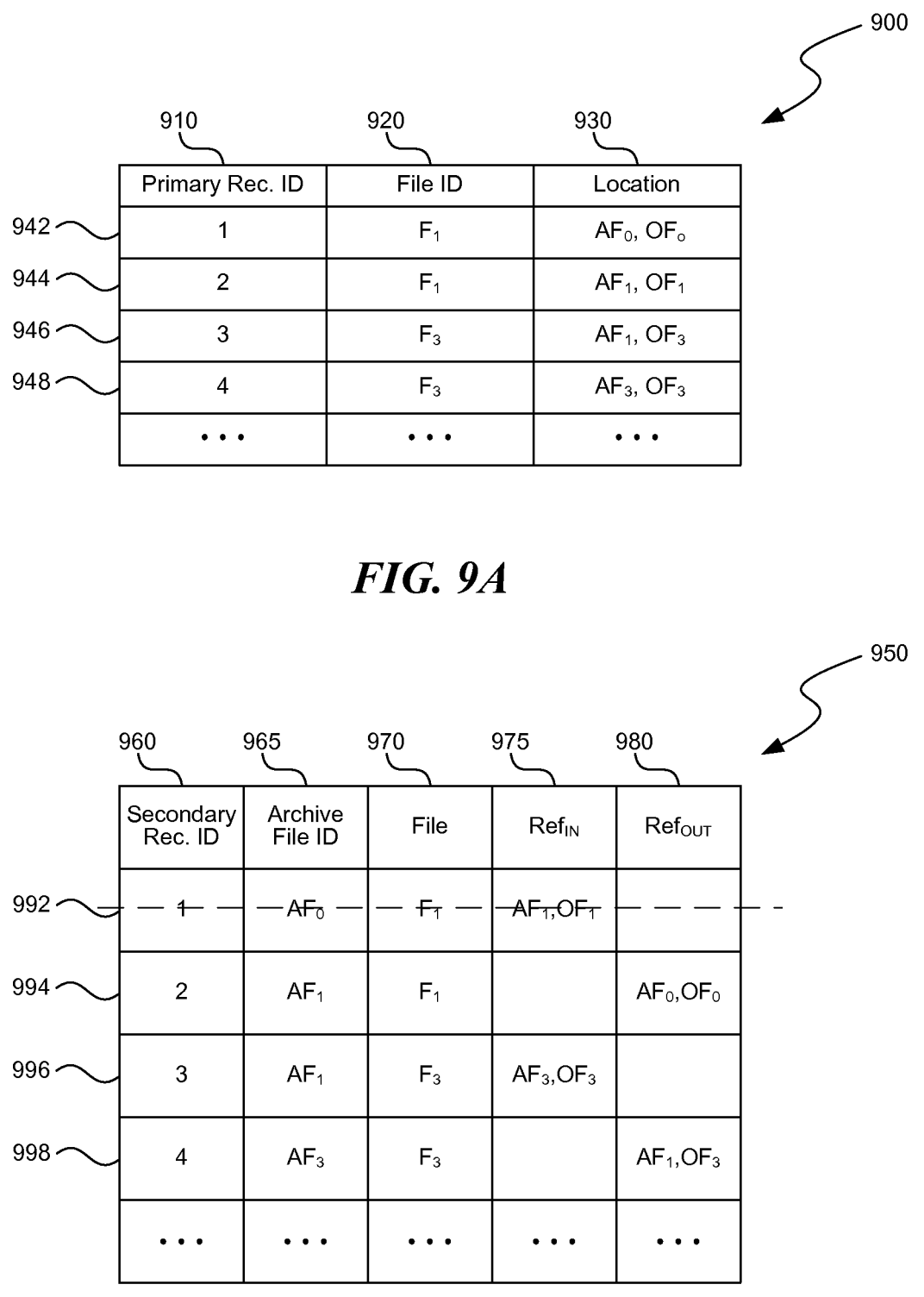

| | Primary Rec. ID | File ID | Location |
|---|---|---|---|
| 942 | 1 | $F_1$ | $AF_0, OF_0$ |
| 944 | 2 | $F_1$ | $AF_1, OF_1$ |
| 946 | 3 | $F_3$ | $AF_1, OF_3$ |
| 948 | 4 | $F_3$ | $AF_3, OF_3$ |
| | ... | ... | ... |

*FIG. 9A*

| | Secondary Rec. ID | Archive File ID | File | $Ref_{IN}$ | $Ref_{OUT}$ |
|---|---|---|---|---|---|
| 992 | ~~1~~ | ~~$AF_0$~~ | ~~$F_1$~~ | ~~$AF_1, OF_1$~~ | |
| 994 | 2 | $AF_1$ | $F_1$ | | $AF_0, OF_0$ |
| 996 | 3 | $AF_1$ | $F_3$ | $AF_3, OF_3$ | |
| 998 | 4 | $AF_3$ | $F_3$ | | $AF_1, OF_3$ |
| | ... | ... | ... | ... | ... |

*FIG. 9B*

| Rec. ID | Archive File ID | Ref$_{IN}$ | Deleted Timestamp |
|---|---|---|---|
| 1 | $AF_0$ | $AF_1, OF_1$ | $T_1$ |
| 2 | $AF_1$ | $AF_3, OF_3$ | $T_2$ |
| 3 | $AF_3$ | ___ | $T_2$ |
| ... | ... | ... | ... |

*FIG. 10*

Primary 1200

| Identifier | Location | Offset | Reference Count |
|---|---|---|---|
| 0xA1B3FG | V_1\Chunk_1\Container File 001 | 10 | 2 |
| 0xFG329A | V_1\Chunk_5\Container File 002 | 6 | 0 |
| 0xC13804 | V_2\Chunk_1\Container File 001 | 38 | 1 |
| ... | | | |

1202 / 1204 / 1206 / 1208

1220 → row 1; 1222 → row 2; 1224 → row 3

*FIG. 12A*

Secondary 650

| Identifier | Referring Location | Offset |
|---|---|---|
| 0xA1B3FG | V_3\Chunk_1\Metadata file 001 | 5 |
| 0xA1B3FG | V_3\Chunk_8\Metadata file 001 | 15 |
| 0xC13804 | V_3\Chunk_2\Metadata file 001 | 19 |
| ... | | |

1252 / 1254 / 1256

1260 → row 1; 1262 → row 2; 1264 → row 3

*FIG. 12B*

SYSTEMS AND METHODS FOR MANAGING SINGLE INSTANCING DATA

CROSS REFERENCE TO RELATED APPLICATIONS

This application is a continuation of U.S. patent application Ser. No. 12/565,576, filed on Sep. 23, 2009, entitled SYSTEMS AND METHODS FOR MANAGING SINGLE INSTANCING DATA, which claims the benefit of U.S. Patent Application No. 61/100,686, filed on Sep. 26, 2008, entitled SYSTEMS AND METHODS FOR MANAGING SINGLE INSTANCING DATA, and is related to U.S. Patent Application No. 61/180,791, filed on May 22, 2009, entitled BLOCK-LEVEL SINGLE INSTANCING, each of which is incorporated by reference in its entirety.

BACKGROUND

Single instancing in a data management system is often the process of attempting to store only a single instance of a file or data object on a storage device. In certain single instancing systems, a separate folder on the file system of the storage device is created for each backup or copy job performed. The files or data objects that are to be stored as a result of the backup or copy job are then placed in the separate folder.

Because there may be numerous computing systems in a data management system, each requiring multiple backup or copy jobs, these techniques may result in the creation of numerous folders, each containing numerous files. For example, if there are hundreds of computing systems, each having thousands of files or data objects to be backed up or copied, backing up or copying all of their files or data objects may potentially result in the creation of millions of files on the secondary storage device.

Certain file systems may not be capable of storing millions of files or more. Other file systems may be well-equipped to handle storing millions of files or more, but may not perform optimally in such situations. Accordingly, a system that provides for the backup or copy of large numbers of files across multiple computing systems would have significant utility.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

FIGS. 9A and 9B are block diagrams illustrating example tables which aspects of the invention may utilize.

FIG. 10 is a block diagram illustrating an example table which aspects of the invention may utilize.

FIGS. 12A and 12B are diagrams illustrating suitable data structures that may be employed by aspects of the invention.

Figure 1:
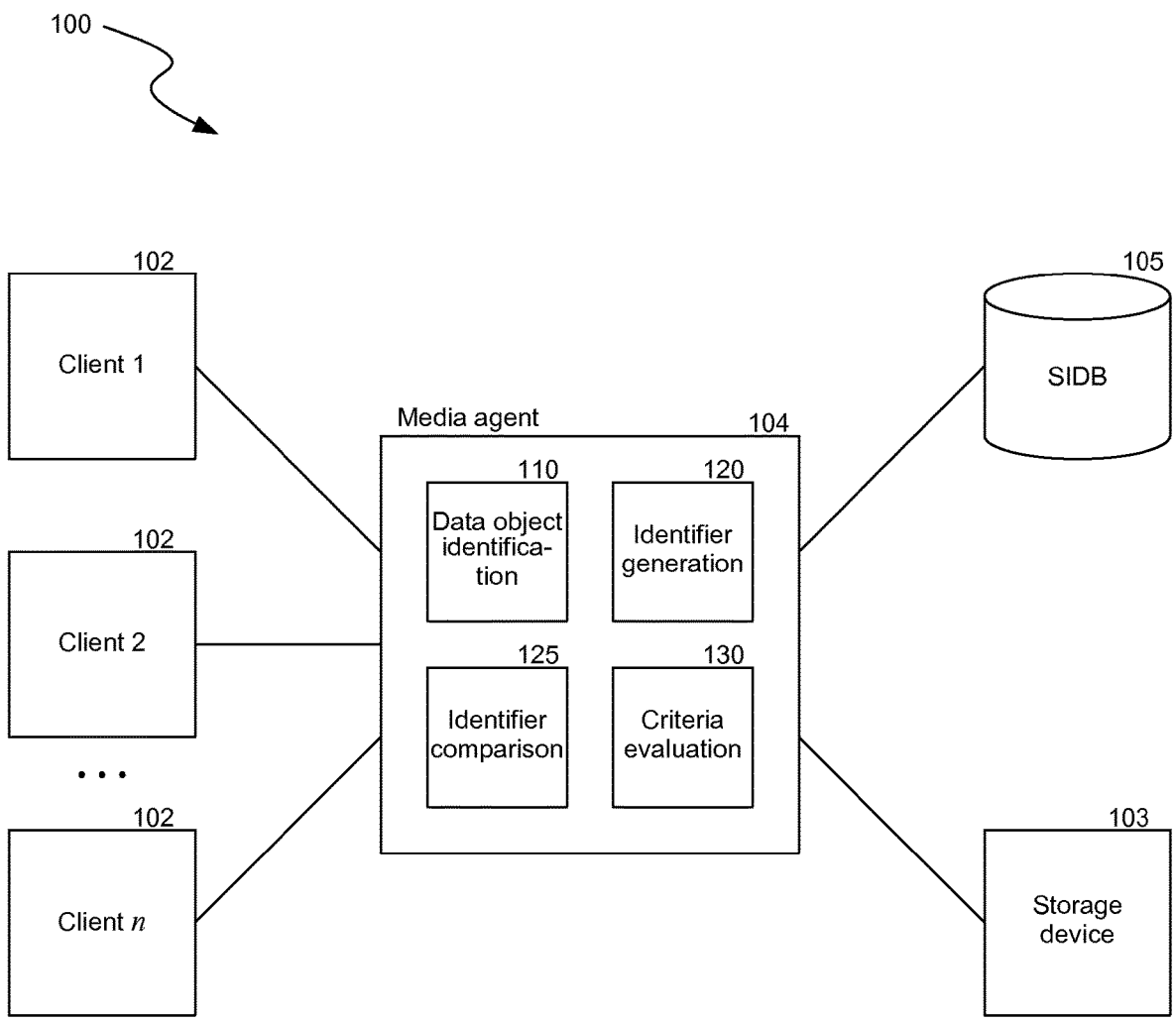
FIG. 1 is a block diagram illustrating an environment in which aspects of the invention may be configured to operate.

In the drawings, the same reference numbers and acronyms identify elements or acts with the same or similar functionality for ease of understanding and convenience. To easily identify the discussion of any particular element or act, the most significant digit or digits in a reference number generally refers to the Figure number in which that element is first introduced (e.g., element 102 is first introduced and discussed with respect to FIG. 1).

DETAILED DESCRIPTION

The headings provided herein are for convenience only and do not necessarily affect the scope or meaning of the claimed invention.

Overview

Described in detail herein are systems and methods for managing single instanced data (alternatively called deduplicated data) in a data storage network. Using a single instance database and other constructs (e.g. sparse files), data density on archival media (e.g., magnetic tape) is improved, and the number of files per storage operation is reduced. According to one aspect of a method for managing single instancing data, for each storage operation, a chunk folder is created on a storage device that stores single instancing data. The chunk folder contains three container files: 1) a container file that contains data objects that have been single instanced; 2) a container file that contains data objects that were not eligible for single instancing; and 3) an index file used to track the location of data objects within the other files. A second storage operation subsequent to a first storage operation contains references to data objects in the chunk folder created by the first storage operation instead of the data objects themselves.

By storing multiple data objects in a small number of container files (as few as two), the storing of each data object as a separate file on the file system of the storage device can be avoided. This reduces the number of files that would be stored on the file system of the storage device, thereby ensuring that the storage device can adequately store the data of computing devices in the data storage network. Therefore, the file system of the storage device may not necessarily have to contend with storing excessively large numbers of files, such as millions of files or more. Accordingly, these techniques enable very large numbers of data objects to be stored without regard to limitations of the file system of the storage device.

Various examples of the invention will now be described. The following description provides specific details for a thorough understanding and enabling description of these examples. One skilled in the art will understand, however, that the system may be practiced without many of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description.

Figure 2A:
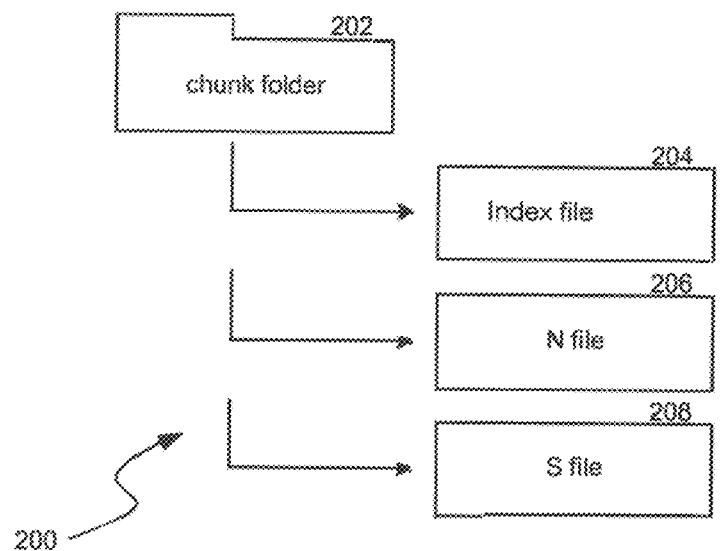
FIGS. 2A-2D are block diagrams illustrating various data structures which aspects of the invention may utilize.
Figure 2B:
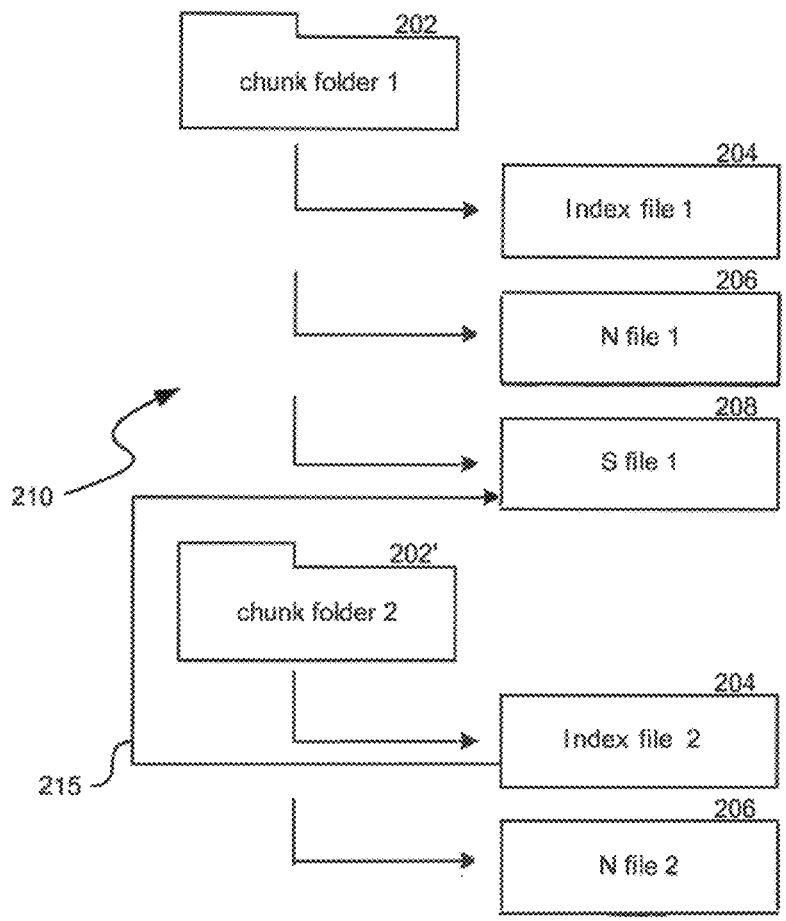
Figure 2C:
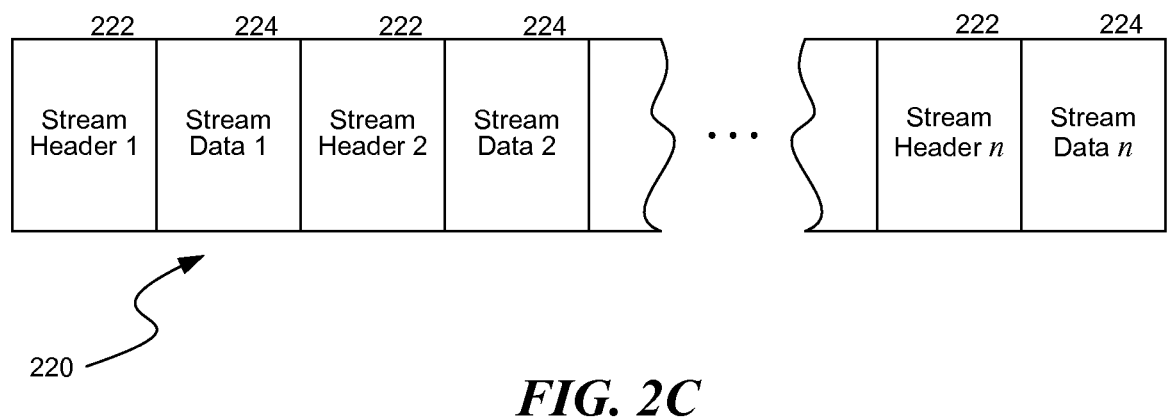
Figure 2D:
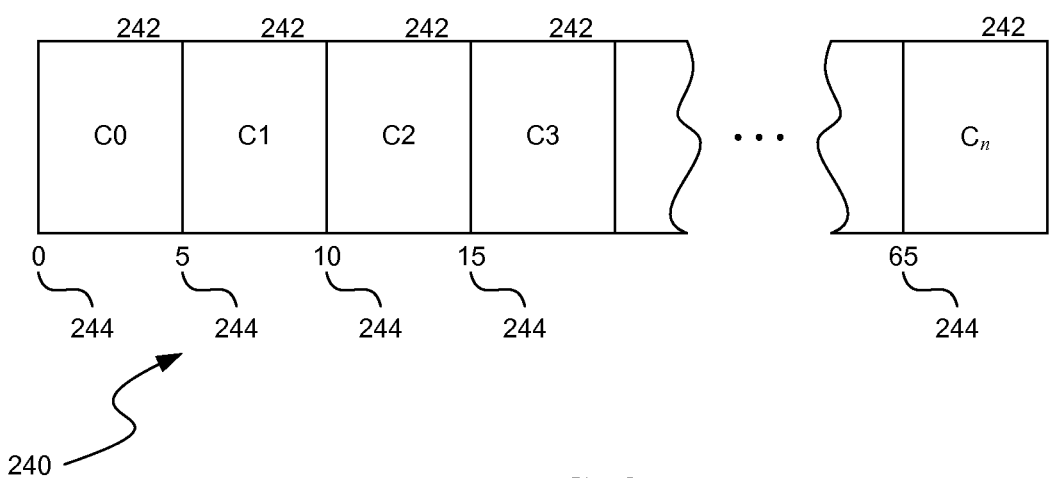
Figure 3:
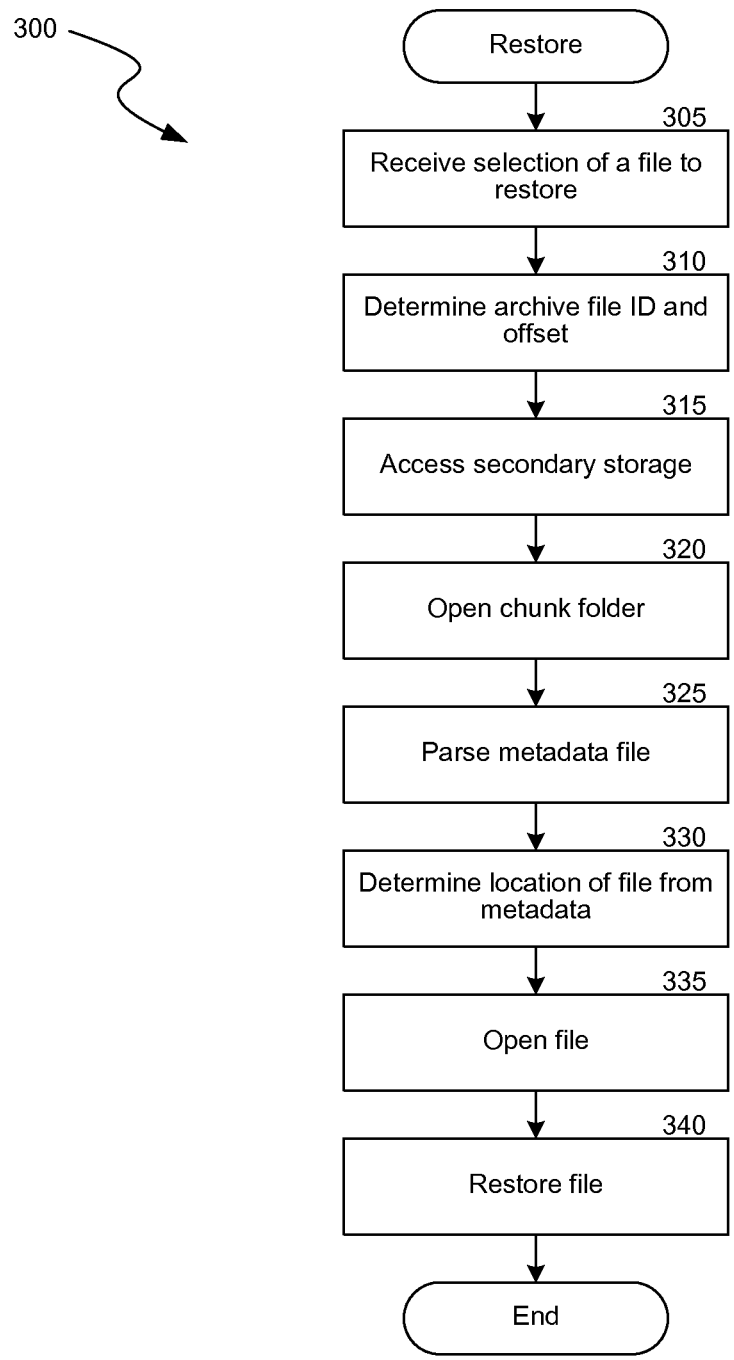
FIG. 3 is a flow diagram illustrating a process for restoring data.
Figure 4:
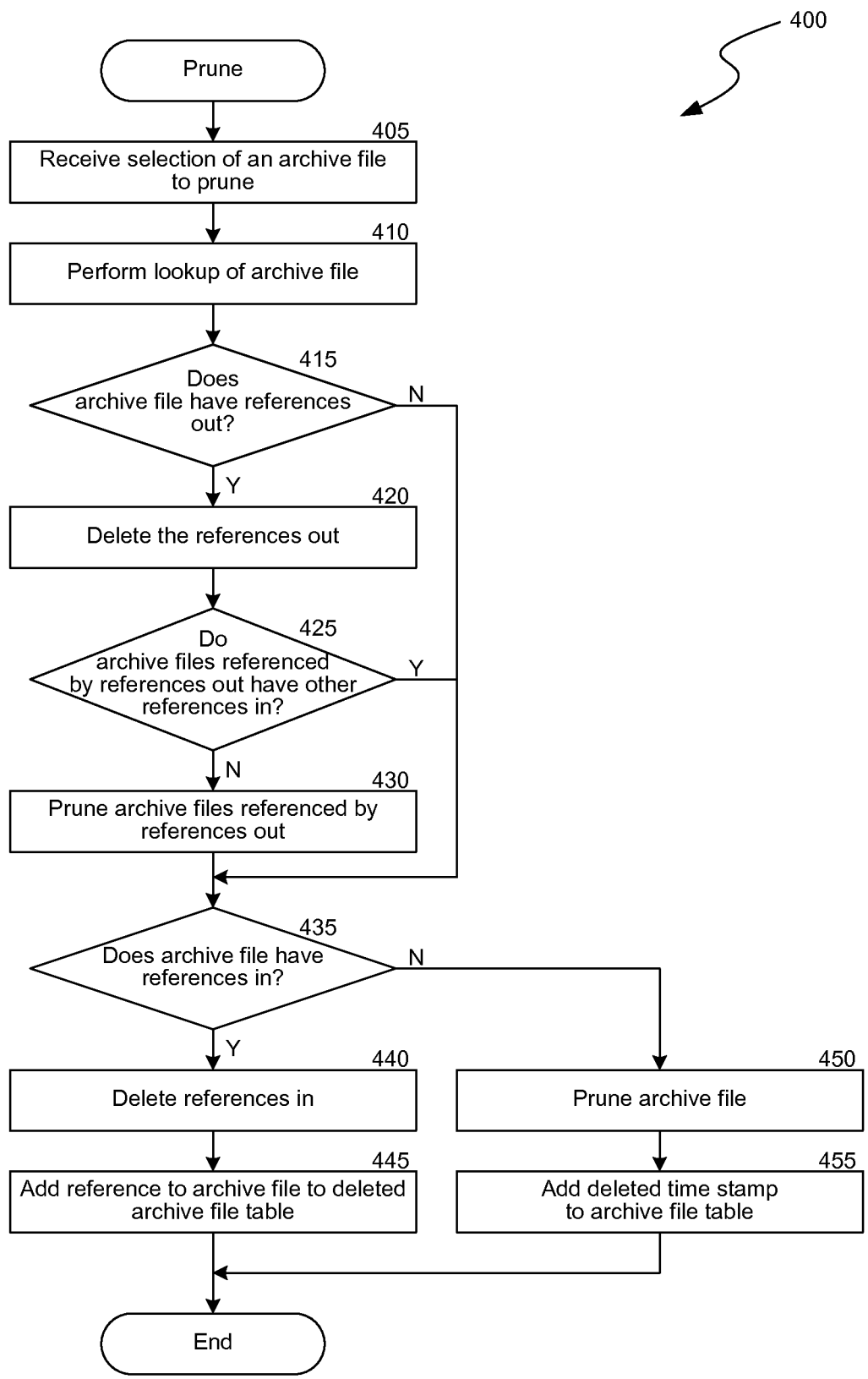
FIG. 4 is a flow diagram illustrating a process for pruning data.
Figure 5:
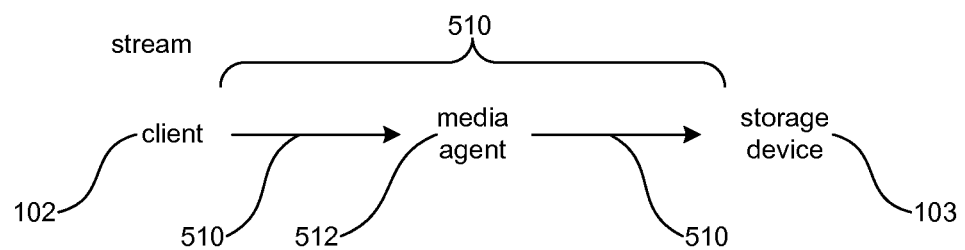
FIG. 5 is a block diagram illustrating components of a data stream that may be used in a suitable data storage system.
Figure 6:
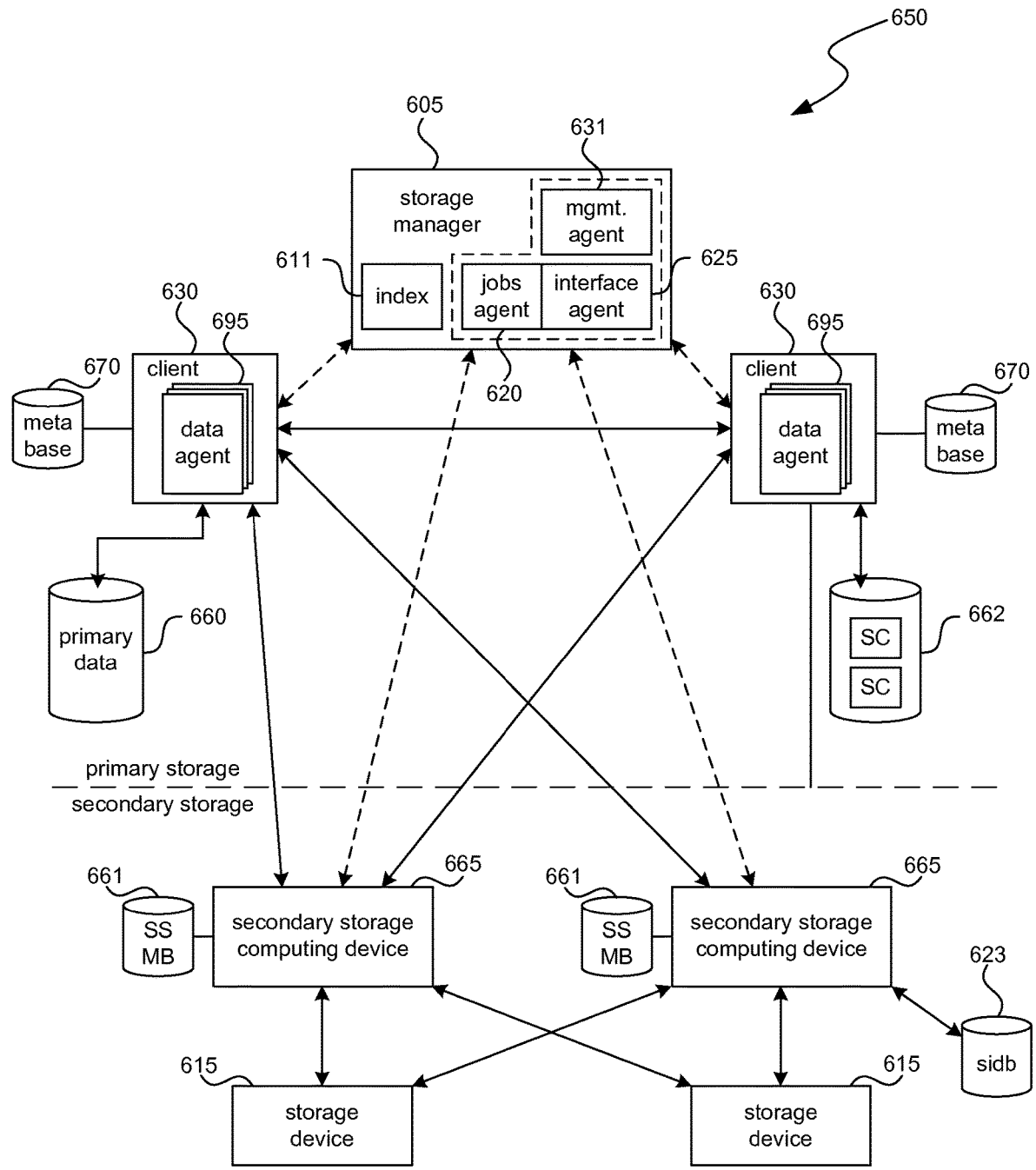
FIG. 6 is a block diagram illustrating an example of a data storage system.
Figure 7:
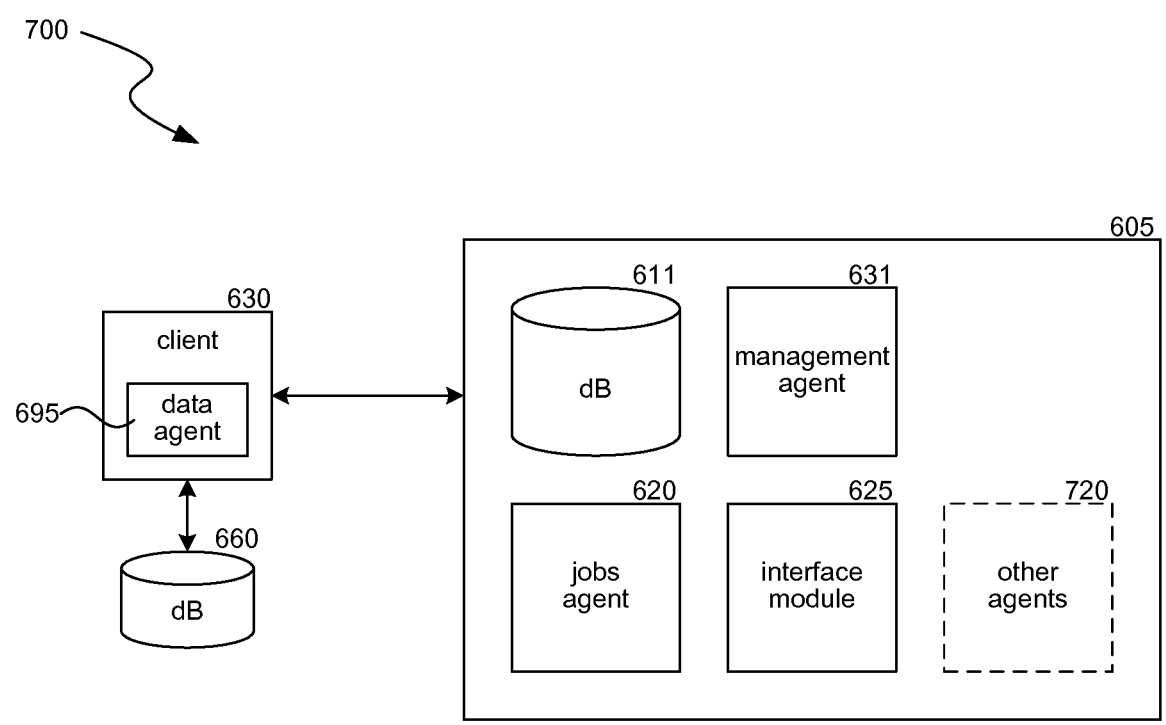
FIG. 7 is block diagram illustrating an example of components of a server used in data storage operations.

Aspects of the invention will now be described in detail with respect to FIGS. 1 through 10. FIG. 1 is a block diagram illustrating an environment in which aspects of the invention may be configured to operate. FIGS. 2A-2D are block diagrams illustrating various data structures: FIG. 2A illustrates a chunk folder and files contained within the chunk folder; FIG. 2B illustrates multiple chunk folders, files contained within the chunk folders and a reference from a file in one chunk folder to a file in another chunk folder; FIG. 2C illustrates a data structure for a index file; and FIG. 2D illustrates a data structure for storing data on secondary storage (e.g., on tape.) FIGS. 3 and 4 are flow diagrams illustrating processes for restoring and pruning data, respectively. FIGS. 5-7 are block diagrams illustrating various aspects of data storage. FIGS. 8A, 8B, 9A, 9B, and 10 are block diagrams illustrating various data structures and/or tables that may be utilized by aspects of the invention.

Figure 11A:
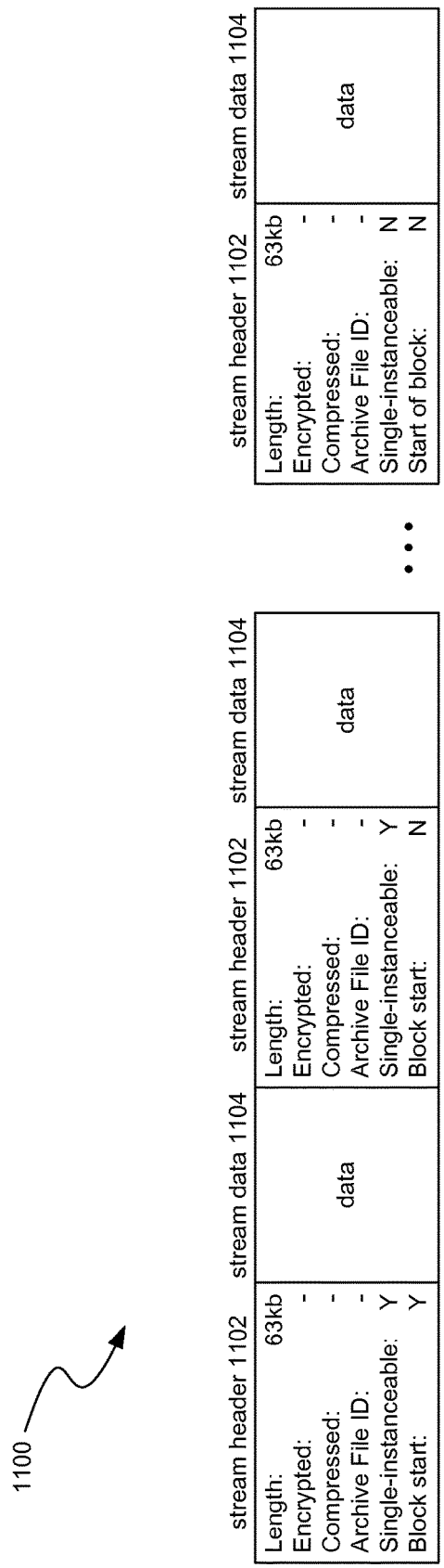
FIGS. 11A and 11B are diagrams illustrating suitable data structures that may be employed by aspects of the invention.
Figure 11B:
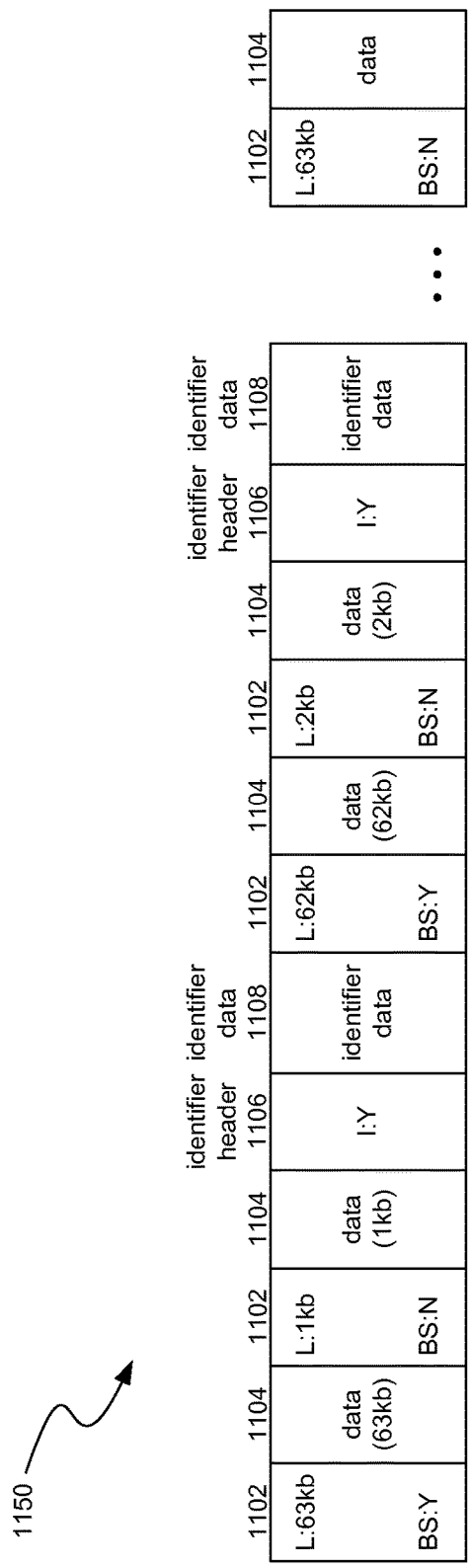
Figure 13:
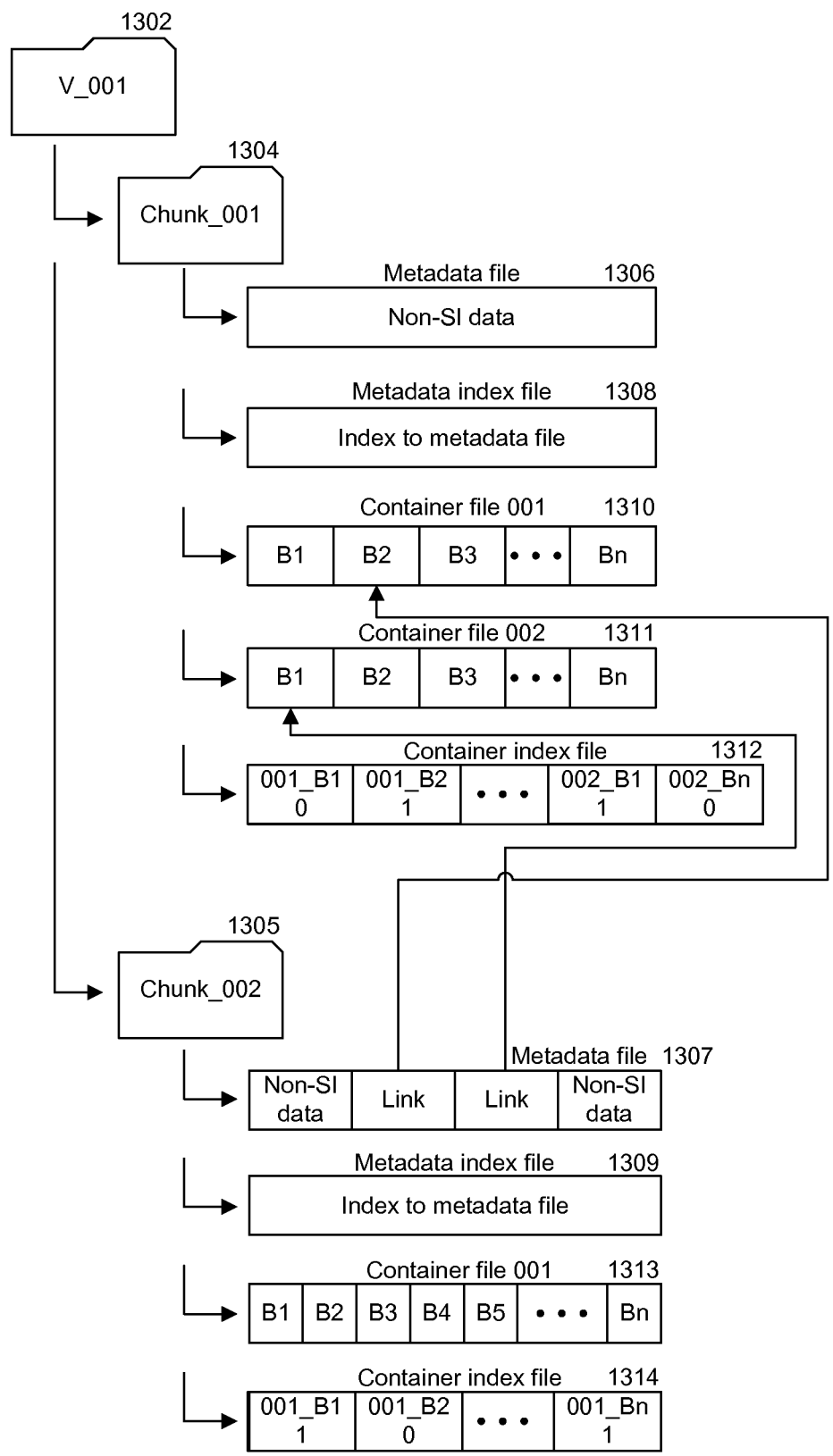
FIG. 13 is a diagram illustrating various data structures that aspects of the invention may utilize.
Figure 14:
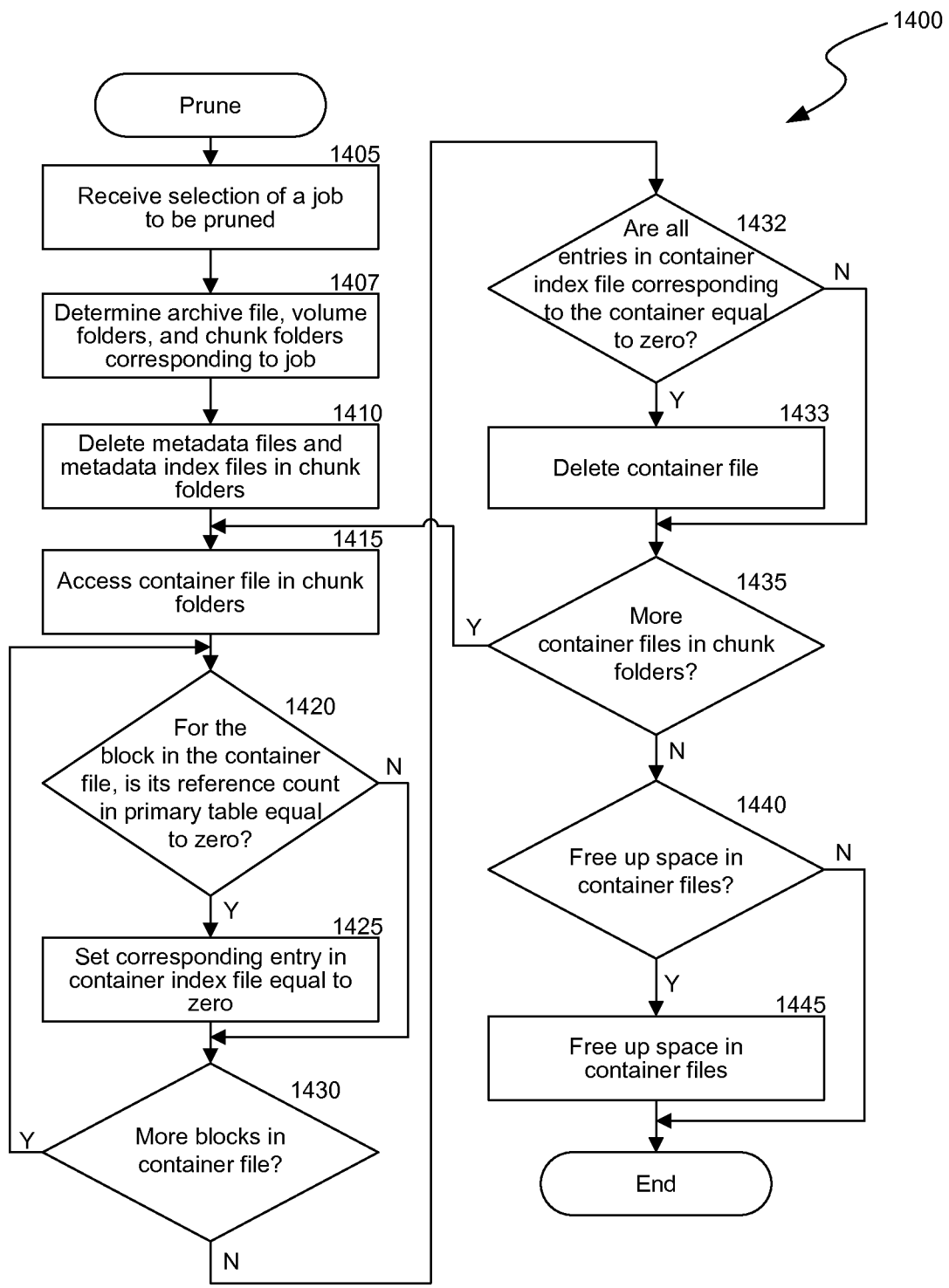
FIG. 14 is a flow diagram of another process for pruning data.

FIGS. 11A and 11B, 12A and 12B, and 13 are illustrations of various data structures that aspects of the invention may utilize. FIGS. 11A and 11B depict data streams that the computing device may form during the copy process. FIGS. 12A and 12B show data structures that may be used by the single instance database to keep track of where blocks of data and references to blocks of data are stored on the storage device. FIG. 13 illustrates data structures that may be used to store blocks of data on the storage device. FIG. 14 is a process flow diagram that depicts an example process that a media agent may perform to prune data stored on the storage device when it is no longer required to be stored on the storage device.

Suitable Environments

FIG. 1 is a block diagram illustrating an environment 100 in which aspects of the invention may be configured to operate. The environment 100 includes one or more clients 102, a media agent 104, a single instance database 105 and a storage device 103. Each of the clients 102 is a computing device, examples of which are described herein. The clients 102 are connected to the media agent 104, which is also a computing device. The media agent 104 is connected to the single instance database 105, which is a data store, and to the storage device 103. Both the single instance database 105 and the storage device 103 may be any type of storage suitable for storing data, such as Directly-Attached Storage (DAS) such as hard disks, a Storage Area Network (SAN), e.g., a Fibre Channel SAN, an iSCSI SAN or other type of SAN, Network-Attached Storage (NAS), a tape library, or any other type of storage. The clients 102 and the media agent 104 typically include application software to perform desired operations and an operating system on which the application software runs. The clients 102 and the media agent 104 typically also include a file system that facilitates and controls file access by the operating system and application software. The file system facilitates access to local and remote storage devices for file or data access and storage.

The media agent 104 includes various components that perform various functions. These components include a data object identification component 110, an identifier generation component 120, an identifier comparison component 125, and a criteria evaluation component 130. The file identification component 110 identifies files or data objects, such as in response to a storage operation. The identifier generation component 120 generates an identifier for the file or data object (identifiers are discussed in more detail below). The identifier comparison component 125 performs comparisons of identifiers of various files or data objects to determine if the files or data objects contain similar data (for example, the identifier comparison component 130 can compare identifiers of two or more files or data objects to determine if the files or data objects contain the same data; metadata such as access control lists (ACLs), descriptive metadata that describes the files or data objects (e.g., file name, file size, file author, etc.) of the two or more files or data objects may differ. The criteria evaluation component 130 evaluates aspects of files or data object against a set of criteria. The media agent 104 may also contain other components that perform other functions.

The clients 102, as part of their functioning, utilize data, which includes files, directories, metadata (e.g., ACLs, descriptive metadata, and any other streams associated with the data), and other data objects. (More details as to the storage operations involving ACLs may be found in the assignee's U.S. patent application Ser. No. 12/058,518, entitled SYSTEM AND METHOD FOR STORAGE OPERATION ACCESS SECURITY, the entirety of which is incorporated by reference herein.) The data on the clients 102 is generally a primary copy (e.g., a production copy). During a copy, backup, archive or other storage operation, the clients 102 send a copy of each data object in the data to the media agent 104. The media agent 104 generates an identifier for each data object.

Examples of identifiers include a hash value, message digest, checksum, digital fingerprint, digital signature or other sequence of bytes that substantially uniquely identifies the file or data object in the data storage system. For example, identifiers could be generated using Message Digest Algorithm 5 (MD5) or Secure Hash Algorithm SHA 512. In some instances, the phrase "substantially unique" is used to modify the term "identifier" because algorithms used to produce hash values may result in collisions, where two different data objects, when hashed, result in the same hash value. However, depending upon the algorithm or cryptographic hash function used, collisions should be suitably rare and thus the identifier generated for a file or data object should be unique throughout the system. The term "probabilistically unique identifier" may also be used. In this case, the phrase "probabilistically unique" is used to indicate that collisions should be low-probability occurrences, and, therefore, the identifier should be unique throughout the system. In some examples, data object metadata (e.g., file name, file size) is also used to generate the identifier for the data object.

After generating the identifier for a data object, the media agent 104 determines whether it should be stored on the storage device 103. The storage device 103 stores a secondary copy (e.g., a backup copy) of the data of the clients 102. To determine this, the media agent 104 accesses the single instance database 105 to check if a copy or instance of the data object has already been stored on the storage device 103. The single instance database 105 utilizes one or more tables or other data structures to store the identifiers of the data objects that have already been stored on the storage device 103. If a copy or instance of the data object has not already been stored on the storage device 103, the media agent 104 sends the copy of the data object to the storage device 103 for storage and adds its identifier to the single instance database 105. If a copy or instance of the data object has already been stored, the media agent 104 can avoid sending another copy to the storage device 103. In this case, the media agent 104 may add a reference (e.g., to an index in the single instance database 105, such as by incrementing a reference count in the index) to the already stored instance of the data object, and may only store a pointer to the data object on the storage device 103. As explained below, adding a reference to the already stored instance of the data object enables storing only a single instance of the data object while still keeping track of other instances of the data object that do not need to be stored.

In some examples, instead of the clients 102 sending the data objects to the media agent 104 and the media agent 104 generating the identifiers, the clients 102 can themselves generate an identifier for each data object and transmit the identifiers to the media agent 104 for lookup in the single instance database 105. If the media agent 104 determines that an instance of a data object has not already been stored on the storage device 103, the media agent 104 can instruct the client 102 to send it a copy of the data object, which it then stores on the storage device 103. Alternatively, the client 102 itself can send the copy of the data object to the storage device 103. More details as to the generation of the identifiers may be found in the assignee's U.S. patent application Ser. No. 12/058,367, entitled SYSTEM AND METHOD FOR STORING REDUNDANT INFORMATION, the entirety of which is incorporated by reference herein. In some examples, the media agent 104 generates the identifier on data already stored on the storage device 103 or on other storage devices (e.g., secondarily stored data is single instanced).

The media agent 104 can support encrypted data objects. For example, one client 102 could generate an identifier for a data object and then encrypt it using one encryption algorithm. Another client 102 could generate an identifier for another data object and then encrypt it using another encryption algorithm. If the two data objects are identical (meaning the two objects have the same data, while their metadata, such as ACLs or descriptors, could be different), they will both have the same identifier. The media agent 104 can then store both encrypted instances of the data object or only a single encrypted instance. In some examples, the media agent 104 stores a key or other mechanism to be used to encrypt and/or decrypt data. The media agent 104 can also support compressed data objects. In general, the same compression algorithm may be used to compress data objects. Therefore, the media agent 104 can generate an identifier for a data object before or after it has been compressed. More details as to how the media agent 104 can support encryption and compression in a single instancing system may be found in the assignee's U.S. patent application Ser. No. 12/145,342, entitled APPLICATION-AWARE AND REMOTE SINGLE INSTANCE DATA MANAGEMENT, the entirety of which is incorporated by reference herein.

Suitable Data Structures and Examples

FIGS. 2A and 2B are block diagrams illustrating various data structures which aspects of the invention may utilize for storing copies or instances of data objects on the storage device 103. FIG. 2A illustrates a data structure 200 used in a storage operation. For the storage operation, a chunk folder 202 is created on the storage device 103. Contained within the chunk folder are three files: 1) an index file 204; 2) an "N" file 206; and 3) a single instance, or "S" file 208. The three files are each logical containers of data. The "S" file stores single instanced data (e.g., single instanced files). The "N" file stores data that is not single instanced (e.g., metadata, such as descriptive metadata associated with single instanced files). The index file stores references to location(s) of data objects in the "S" file and the "N" file.

The chunk folder 202 and the files 204-208 may be equivalent to a directory and files (or folder and files) on a file system. For example, the chunk folder 202 may be a directory and the files 204-208 may be files located within the directory. As another example, the chunk folder 202 may be a file and the files 204-208 may be portions of the file. As another example, the files 204-208 may be collections of bytes grouped together. Those of skill in the art will understand that the chunk folder 202 and the files 204-208 may be comprised in various data structures and are not limited to a directory and files within the directory.

The media agent 104 places data objects in the "S" file 208 that meet certain criteria for single instancing. These criteria may include the following: 1) that the data object has been determined to be data or of type data (as opposed to metadata or of type metadata); and 2) that the data object is larger than a pre-configured size, such as 64 Kb. Type data is generally the payload portion of a file or data object (e.g., a file's contents) and type metadata is generally the metadata portion of the file or data object (e.g., metadata such as file name, file author, etc.). This pre-configured size may be configurable by an administrator or other user with the appropriate permissions. For example, if the administrator wants all data objects of type data be single instanced, the administrator can set the pre-configured size to 0 Kb. As another example, if the administrator wants only data objects of type data greater than 128 Kb to be single instanced, the administrator can set the pre-configured size to 128 Kb.

The media agent 104 determines if a data object meets these criteria by evaluating aspects of the data object (e.g., its type, its size) against the criteria. If so, and the data object has not already been stored on the storage device 103 (which the media agent determines by generating an identifier for the data object and looking up the identifier in the single instance database 105), the media agent 104 places the data object in the "S" file 208. The media agent 104 may also apply other criteria that the data object must meet for single instancing (e.g., criteria based upon characterizing or classifying the data object using techniques such as those described in commonly assigned U.S. patent application Ser. No. 11/564,119 (entitled SYSTEMS AND METHODS FOR CLASSIFYING AND TRANSFERRING INFORMATION IN A STORAGE NETWORK, the entirety of which is incorporated by reference herein).

For each data object that is placed in the "S" file 208, the media agent 104 adds a reference to the data object in the index file 204, called an internal reference. For example, the internal reference may be a pointer or link to the location of the data object in the "S" file. As further described herein, the media agent 104 maintains a primary table that contains all the single instance records of all data objects for which an identifier was created. The media agent 104 may add as the internal reference a record of the already stored instance of the data object from the primary table.

The media agent 104 places data objects in the "N" file 206 that do not meet the above criteria for single instancing. For example, a data object may be metadata (e.g., ACLs for a file that is placed in the "S" file, file descriptor information, etc.). In this case, the data object will be placed in the "N" file. As another example, a data object may be smaller than the pre-configured size, e.g., the data object is smaller than 64 Kb. In this case, the media agent 104 may incur too much overhead to generate its identifier and perform a lookup of the identifier in the single instance database 105. Therefore, the data object is placed in the "N" file. For each data object that is placed in the "N" file 206, the media agent 104 may also add a reference to the data object in the index file 204, called an internal reference. For example, the internal reference may be a pointer or link to the location(s) of the data object in the "N" file. A new "N" file may be created during each storage operation job.

FIG. 2B illustrates a data structure 210 that may be created as a result of one or more storage operations. The data structure 210 is similar to the data structure 200 illustrated in FIG. 2A, but now includes a second chunk folder 202'. For example, the media agent 104 may create the second chunk folder 202' as a result of a second storage operation. Consider the situation where a single data object is subjected to two successive storage operations. The first storage operation would result in the creation of the first chunk folder 202 illustrated in FIG. 2A, with the single data object in a first "S" file 208, its metadata (e.g., ACLs) in a first "N" file 206, and any references to the single data object and its metadata in a first index file 204.

The second storage operation would result in the creation of the second chunk folder 202' illustrated in FIG. 2B. As illustrated in FIG. 2B, the second chunk folder 202' would have a second "N" file 206 containing the metadata (e.g., the ACLs of the single data object, regardless of whether or not they have changed) and a second index file 204. Instead of having a second "S" file 208, the second index file 204 would have a pointer 215 to the single data object contained in the first "S" file 208. Because an instance of the single data object is already contained within the first "S" file 208, there is no need for another instance of it to be contained within the second "S" file 208. However, there is a need to keep a record of the fact that the second storage operation involved an instance of the single data object. This is accomplished by the pointer 210 within the second index file 204.

In some cases, instead of always placing data objects in the "N" file 206 that do not meet the above criteria for single instancing, the media agent 104 generates an identifier for the data object, looks up the identifier in the single instance database 105 to see if the data object has already been stored, and if not, places it in the "S" file 208. If the data object has already been stored, the media agent would then add a pointer to the location of the instance of the previously stored data object in the index file 204. For example, this variation on the process could be used to single instance metadata instead of always storing it in the "N" file 206.

FIG. 2C illustrates a data structure 220 for the index file 204. The data structure 220 consists of one or more stream headers 222 and stream data 224. The stream header 222 describes a data object contained in an "N" file 206 or an "S" file 208 (e.g., its location, its size, an offset within the file, etc.). The stream data 224 contains the pointer to the data object contained in the "N" file 206 or the "S" file 208. For example, the pointer may give its location within the "N" file 206 or the "S" file 208. The location of the data object may be given by offsets within the "N" file 206 or the "S" file 208. For example, its location may be given by a starting offset, and its length or size. As another example, its location may be given by a starting offset and an ending offset. As previously mentioned, the data object may be in an "S" file 208 in another chunk folder, and the stream data 224 would point to this "S" file in the other chunk folder (e.g., give its location in the "S" file in the other chunk folder). Each time the media agent 104 places a data object in the "S" file 208, the media agent 104 adds a stream header 222 and corresponding stream data 224 to the index file 204.

One advantage of the data structures 200, 210, 220 illustrated in FIGS. 2A through 2C and the techniques described herein is that they reduce the number of files stored on the file system of the storage device 103. Thus, there are at most three files created for each storage operation—the index file 204, the "N" file 206, and the "S" file 208. Therefore, a maximum number of files on the file system of the storage device 103 will be the number of storage operations performed by media agent 104 multiplied by three. File systems of certain operating systems may have practical limits to the numbers of files that they can store that are well below their theoretical limits. For example, a file system may not, in practice, be able to store a number of files above a certain threshold without experienced significant system degradation (which can be defined in numerous ways, such as an increase in seek time of randomly accessed media that is ten percent longer than normal, a delay in reads or writes on randomly accessed media, or in other ways).

By storing multiple data objects in a small number of container files (as few as two), the storing of each data object as a separate file on the file systems of the storage device can be avoided. This reduces the number of files that would be stored on the file systems of the storage device, thereby ensuring that the storage device can adequately store the data of computing devices in the data storage network. Therefore, the file system of the storage device may not necessarily have to contend with storing excessively large numbers of files, such as millions of files or more. Accordingly, these techniques enable very large numbers of data objects to be stored without regard to limitations of the file system of the storage device.

Even if the media agent 104 performs numerous storage operations using these data structures 200, 210, this will result in far fewer files on the storage device 103 than storage operations where each involved data object is stored as a separate file. Another advantage is that the index files 204 could be used to replicate the data stored in the single instance database 105 or reconstruct the single instance database 105 if its data is ever lost or corrupted. This is because the index files 204 may store essentially the same information as what is stored in the single instance database 105.

However, the storage of data objects in containers such as the "N" file 206 and the "S" file 208 may create additional complexities when it comes time to prune or delete data objects involved in previous storage operations. This is because the data objects are not stored as files on the file system and thus cannot be directly referenced by the file system. For example, consider a first storage operation, involving a first file and a second file, and a second storage operation, involving the first file and a third file, both occurring on the same day. Further consider that the first storage operation's files are eligible to be pruned after 15 days and the second storage operation's files are eligible to be pruned after 30 days. Using the techniques described herein, the first storage operation would store the first and second files in an "S" file 208 and the second storage operation would store a pointer to the first file in an "N" file 206 and the third file in another "S" file 208.

After 15 days have elapsed, the first and second files are eligible to be pruned. The first file is referenced by the "N" file 206 of the second storage operation, and cannot yet be pruned. However, the second file, because it is not referenced by any "N" files 206 in any other storage operations, can be pruned. Using the index file 204 corresponding to the "S" file, the media agent 104 locates the second file within the "S" file 208. The media agent 104 can then instruct the operating system (e.g., a Windows operating system, a Unix operating system, a Linux operating system, etc.) of the storage device 103 to convert the "S" file 208 into a sparse file. A sparse file is well-known type of file having data within but not filling the file's logical space (e.g., at the beginning of the file and at the end of the file, and a hole or empty space in between). In converting the "S" file 208 into a sparse file, the portions corresponding to the second file may be zeroed out. These portions are then available for storage of other files or data objects by the operating system on storage devices (e.g., on magnetic disks, but sparse files may be used on other types of storage devices, such as tape or optical disks). Additionally or alternatively, the "S" file may be designated as a sparse file upon its creation.

After 30 days have elapsed, the first and third files are eligible to be pruned. Assuming that there are no intervening storage operations involving files that reference either of these files, both the first and third files can be pruned. The chunk folders 202 corresponding to the first and second storage operations can be deleted, thereby deleting the index files "204", the "N" files 206" and the "S" files 208 and recovering the space previously allocated for their storage. (The process for pruning data objects is discussed in greater detail with reference to, e.g., FIGS. 4 and 14.) Therefore, the data structures 200, 210, 220 illustrated in FIGS. 2A through 2C and the techniques described herein also allow for pruning data objects to recover space previously allocated to them on the storage device 103.

Accordingly, the data structures 200, 210, 220 illustrated in FIGS. 2A through 2C and the techniques described herein enable the performance of storage operations cumulatively involving very large numbers of data objects, while still allowing for recovery of space allocated to these data objects when their storage is no longer required. For example, an administrator can back up numerous files across numerous clients and avoid storing redundant copies or instances of the files. The administrator can also easily recover space on the storage device 103 when it is no longer required to store the files, for example, as according to a retention policy that indicates for how long files are to be stored on the storage device 103. Accordingly, the data structures and techniques described herein enable the optimization of storage operations involving very large numbers of data objects.

After having been stored on the storage device 103, files contained in chunks may be moved to secondary storage, such as to disk drives or to tapes in tape drives. More details as to these operations may be found in the previously-referenced U.S. patent application Ser. No. 12/058,367. In moving chunks to secondary storage, they may be converted into an archive file format. In some examples, the techniques described herein may be used to single instance data already stored on secondary storage.

FIG. 2D is an illustration of a data structure 240 for storing chunk folders and their contained files in an archive file format. The archive file may be stored on various storage devices, such as on disk drives or on magnetic tapes. The archive file includes a chunk 0 242 located at offset 0, a chunk 1 242 located at offset 5, a chunk 2 242 located at offset 10, a chunk 3 242 located at offset 15, and a chunk n located at offset 65. The offsets are in relation to the start of the archive file. More details as to a suitable archive file format may be found in the assignee's U.S. patent application Ser. No. 11/950,376, entitled SYSTEMS AND METHODS FOR CREATING COPIES OF DATA, SUCH AS ARCHIVE COPIES, the entirety of which is incorporated by reference herein. An archive file may be considered as a container of data objects.

FIGS. 11A and 11B are diagrams of data streams 1100 and 1150, respectively, that may be employed by aspects of the invention in some examples. Referring to FIG. 11A, the client 102 forms the data stream 1100 from the data of the client 130. The data stream 1100 is composed of multiple pairs of stream header 1102 and stream payload 1104. A stream payload 1104 includes single instanceable (SI) data and/or non-SI data. A stream header 1102 includes metadata about the stream payload 1104. This metadata may include, for example, a length of the stream payload 1104, an indication of whether the stream payload 1104 is encrypted, an indication of whether the stream payload 1104 is compressed, an archive file identifier (ID), an indication of whether the stream payload 1104 is single instanceable, and an indication of whether the stream payload 1104 is a start of a block of data.

Referring to FIG. 11B, the data stream 1150 has the stream header 1102 and stream payload 1104 aligned into multiple data blocks. In this example, the data blocks are of size 64 Kb. The first two stream header 1102 and stream payload 1104 pairs comprise a first data block of size 64 Kb. The first stream header 1102 indicates that the length of the succeeding stream payload 1104 is 63 Kb and that it is the start of a data block. (The stream header 1102 may also include additional metadata.) The next stream header 1102 indicates that the succeeding stream payload has a length of 1 Kb and that it is not the start of a new data block. Immediately following that stream payload 1104 are an identifier header 1106 and identifier data 1108 pair. The identifier header 1106 includes an indication that the succeeding identifier data 1108 includes the identifier for the immediately previous data block. The identifier data 1108 includes the identifier that the data agent (e.g., the identifier generation component 206) generated for the data block. The data stream 1150 also includes other stream header 1102 and stream payload 1104 pairs, which may be for SI data and/or for non-SI data.

FIGS. 12A and 12B are diagrams illustrating data structures that may be used by the single instance database 105 in some examples. The data structures include a primary table 1200 and a secondary table 1250. Referring to FIG. 12A, the primary table 1200 includes an identifier column 1202 in which a data block identifier is stored, a location column 1204 in which a location of the data block in a container file is stored, an offset column 1206 indicating the offset within the container file corresponding to the location of the data block, and a reference count column 1208, which contains a reference count of the number of links that refer to the data block. For example, row 1220 includes information about a data block for which the identifier is "0xA1B3FG." This data block is located in the container file that is indicated in the location column 1206, at an offset of 10 within the container file. As indicated in the reference count column 1208, this data block is referred to twice, meaning that there are two links that refer to the data block. As another example, row 1224 includes information about a data block for which the identifier is "0xC13804." The location of this data block is indicated in the location column 1204 at an offset of 38 within the container file, and it is referred to one other time, by one link.

Referring to FIG. 12B, the secondary table 1250 includes information about links that refer to data blocks. The secondary table 1250 includes an identifier column 1252, a referring location column 1254, and an offset column 1256. For example, row 1260 includes information about a reference to the data block having the identifier of "0xA1B3FG" (row 1220 in the primary table 1200). The location of the link is indicated in column 1254, at an offset of five within the indicated metadata file. As another example, row 1262 includes information about another reference to the data block having the identifier of "0xA1B3FG." This link is located at the location indicated in column 1254, at an offset of 15 within the indicated metadata file. As another example, row 1264 includes information about a reference to the block for which the identifier is "0xC13804" (row 1224 in the primary table 1200). The location of the link is indicated in column 1254, at an offset of 19 within the indicated metadata file.

FIG. 13 is a diagram illustrating data structures that may be used to store blocks of SI data and non-SI data on the storage device 103. The data structures include one or more volume folders 1302, one or more chunk folders 1304/1305 within a volume folder 1302, and multiple files within a chunk folder 1304. Each chunk folder 1304/1305 includes a metadata file 1306/1307, a metadata index file 1308/1309, one or more container files 1310/1311/1313, and a container index file 1312/1314. The metadata file 1306/1307 stores non-SI data blocks as well as links to SI data blocks stored in container files. The metadata index file 1308/1309 stores an index to the data in the metadata file 1306/1307. The container files 1310/1311/1313 store SI data blocks. The container index file 1312/1314 stores an index to the container files 1310/1311/1313. Among other things, the container index file 1312/1314 stores an indication of whether a corresponding block in a container file 1310/1311/1313 is referred to by a link in a metadata file 1306/1307. For example, data block B2 in the container file 1310 is referred to by a link in the metadata file 1307 in the chunk folder 1305. Accordingly, the corresponding index entry in the container index file 1312 indicates that the data block B2 in the container file 1310 is referred to. As another example, data block B1 in the container file 1311 is referred to by a link in the metadata file 1307, and so the corresponding index entry in the container index file 1312 indicates that this data block is referred to.

As an example, the data structures illustrated in FIG. 13 may have been created as a result of two storage operations involving two clients 102. For example, a first storage operation on a first client 102 could result in the creation of the first chunk folder 1304, and a second storage operation on a second client 102 could result in the creation of the second chunk folder 1305. The container files 1310/1311 in the first chunk folder 1304 would contain the blocks of SI data of the first client 102. If the two clients 102 have substantially similar data, the second storage operation on the data of the second client 102 would result in the media agent 104 storing primarily links to the data blocks of the first client 102 that are already stored in the container files 1310/1311. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the media agent 104 supports sparse files, then when the media agent 104 creates container files 1310/1311/1313, it can create them as sparse files. As previously described, a sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 1310/1311/1313 be sparse files allows the media agent 104 to free up space in the container files 1310/1311/1313 when blocks of data in the container files 1310/1311/1313 no longer need to be stored on the storage devices 103. In some examples, the media agent 104 creates a new container file 1310/1311/1313 when a container file 1310/1311/1313 either includes 100 blocks of data or when the size of the container file 1310 exceeds 50 Mb. In other examples, the media agent 104 creates a new container file 1310/1311/1313 when a container file 1310/1311/1313 satisfies other criteria (e.g., it contains from approximately 100 to approximately 1000 blocks or when its size exceeds approximately 50 Mb to 1 Gb). Those of skill in the art will understand that the media agent 104 can create a new container file 1310/1311/1313 when other criteria are met.

In some cases, a file on which a storage operation is performed may comprise a large number of data blocks. For example, a 100 Mb file may be comprised in 400 data blocks of size 256 Kb. If such a file is to be stored, its data blocks may span more than one container file, or even more than one chunk folder. As another example, a database file of 20 Gb may comprise over 40,000 data blocks of size 512 Kb. If such a database file is to be stored, its data blocks will likely span multiple container files, multiple chunk folders, and potentially multiple volume folders. As described in detail herein, restoring such files may thus requiring accessing multiple container files, chunk folders, and/or volume folders to obtain the requisite data blocks.

One advantage of the data structures illustrated in FIG. 13 and/or of the techniques described herein is that they significantly reduce the number of files stored on a file system of the storage device 103. This is at least partly due to the storage of data blocks within the container files 1310/1311/1313. Even if numerous storage operations using these data structures are performed, this will result in far fewer files on the storage device 103 than storage operations where each data block is stored as a separate file. Therefore, the file system of the storage device 103 may not necessarily have to contend with storing excessively large numbers of files, such as millions of files or more. Accordingly, the systems and methods described herein enable very large numbers of blocks of data to be stored without regard to limitations of the file system of the storage device 103.

Another advantage is that the data storage system enables a reduction in the amount of blocks of data stored on the storage devices 103, while still maintaining at least one instance of each block of data in primary data. In examples where the data storage system stores a variable number of instances of blocks of data, blocks of data can be distributed across two or more storage devices 103, thereby adding a further aspect of redundancy.

Another advantage is that the metadata files 1306/1307, the metadata index files 1308/1309, the container files 1310/1311/1313, and/or the container index files 1312/1314 could be used to replicate the data stored in the single instance database 105 or reconstruct the single instance database 105 if the data of the single instance database 105 is ever lost and/or corrupted.

The storage of data blocks in the container files may create additional complexities when it comes time to prune (delete) data blocks that the data storage system no longer need retain. This is because the data blocks are not stored as files on the file system on the storage device 103 and thus cannot be directly referenced by the file system. As described in detail with reference to FIG. 14, the media agent 104 uses the container index files 1312/1314 to keep track of which blocks of data are referenced and thus which blocks are not prunable (deletable).

In some examples, the use of the container index files 1312/1314, the metadata index files 1308/1309, and/or the primary and secondary tables 1200/1250 to track data is a driver, agent or an additional file system that is layered on top of the existing file system of the storage device 103. This driver/agent/additional file system allows the data storage system to efficiently keep track of very large numbers of blocks of data, without regard to any limitations of the file systems of the storage devices 103. Accordingly, the data storage system can store very large numbers of blocks of data.

Accordingly, the data structures illustrated in FIG. 13 and the techniques described herein enable the performance of multiple storage operations cumulatively involving very large amounts of data, while still allowing for recovery of space on the storage device 103 when storage of certain data blocks is no longer required. For example, the data of numerous clients 102 can be protected without having to store redundant copies or instances of data blocks. Space on the storage device 103 can also be recovered when it is no longer necessary to store certain data blocks. Accordingly, storage operations involving very large amounts of data are enabled and optimized by the techniques described herein.

Restoring Data

FIG. 3 is a flow diagram illustrating a process 300 for restoring data objects from chunk folders in an archive file format on secondary storage. For example, an administrator may wish to restore a data object that has been archived to sequential access media, such as tape. In order to do so, the system identifies the appropriate tape media, the archive file on that tape media, the chunk file within that archive file, and finally the location of the data object within that chunk file. At step 305 a selection of a data object to restore is received, such as from an administrator via a graphical interface.

Figure 8A:
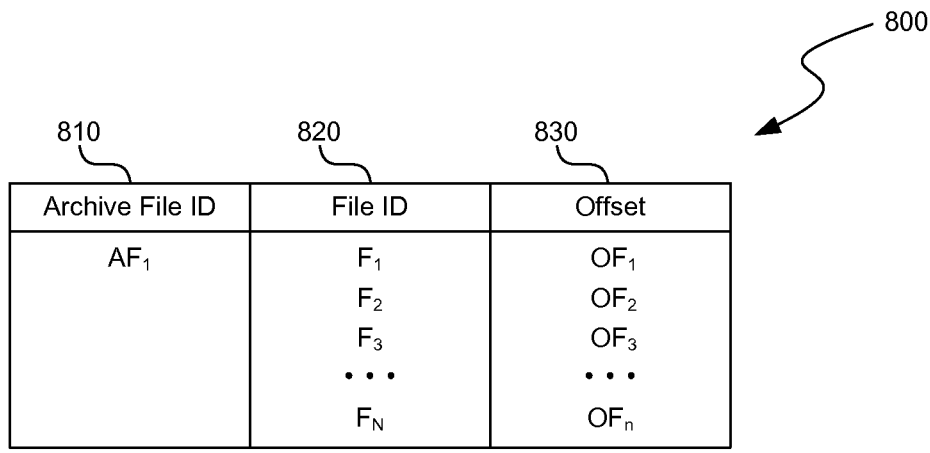
FIGS. 8A and 8B are block diagrams illustrating example data structures which aspects of the invention may utilize.

At step 310 the media agent 104 is consulted to determine an archive file ID and an offset of the data object to be restored. The media agent 104 can determine this information from a data structure, such as a tree index (for example, a c-tree may be used, which, in some examples, is a type of self-balancing b-tree), it maintains for each archive file. For example, an archive file may be based on files 1 through n, with file 1 at offset 1, file 2 at offset 2, file n at offset n, and so on. The media agent 104 maintains one tree index per full storage operation cycle. (A storage operation cycle consists of a cycle from one full storage operation of a set of data, including any intervening incremental storage operations, until another full storage operation is performed.) FIG. 8A illustrates an example data structure 800 that the media agent 104 maintains. The data structure 800 includes an archive file ID item 810 which contains the identifier of archive files, a file or data object item 820 which contains the identifier of the file or data object, and an offset 830 containing the offset of the file or data object within the archive file.

The media agent 104 may also maintain a multiple-part identifier, such as a five-part identifier, that includes an enterprise or domain identifier (e.g., an identifier of a grouping of clients), a client identifier to identify the client/host, an application type, a storage operation set identifier to identify when the storage operation data was obtained, and a subclient identifier to provide a further level of granularity within an enterprise to identify an origin, location, or use of the data (e.g., a file system on a client could be a subclient, or a database on a client could be a subclient).

Using the data structure maintained for the archive file, the media agent 104 determines the archive file ID and offset within the archive file of the data object to be restored. The media agent 104 then needs to determine which chunk contains the data object. To do so, the media agent 104 consults another server, such as a storage manager (discussed below), that has a data structure that maps the archive file ID and offset to the specific media (as well as the specific chunk file within the specific media, optionally). For example, the storage manager may maintain a database table that maps the archive file ID to specific media, such as the archive file ID to a bar code number for a magnetic tape cartridge storing that archive file.

Figure 8B:
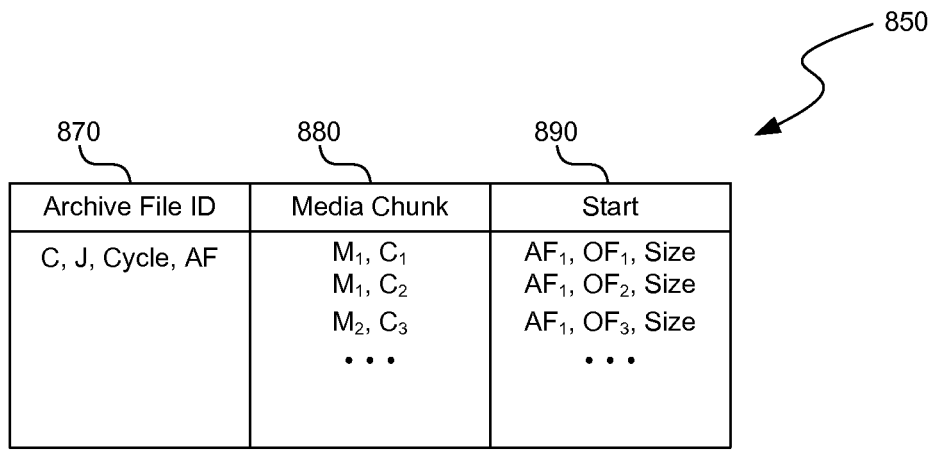

FIG. 8B illustrates an example data structure 850 that the storage manager maintains. The data structure 850 includes an archive file ID item 870 identifying a client, a storage operation job, a cycle, and an archive file ID, a media chunk item 880 containing an identifier of the media containing the archive file and the chunk on the media that contains the archive file and a start item 890 that contains the archive file ID, an offset, and a size. The media agent 104 then can consult the single instance database 105 to determine the specific chunk that corresponds to the data object to be restored.

At step 315, the secondary storage is accessed and the specific media, such as a specific tape cartridge in an automated tape library, is accessed. At step 320 the specific chunk folder 202 is opened, and the index file 204 is accessed. At step 325, the index file 204 is parsed until the stream header corresponding to the data object to be restored is accessed. At step 330, the location of the file is determined from the stream data. The stream data indicates the location of the data object to be restored, which is either in the "S" file 208 within the chunk folder 202 or within an "S" File 208 in another chunk folder 202 (or the "N" file for data objects that did not meet the criteria for single instancing). At step 335 the data object is retrieved or opened, and the data object is read and streamed back to restore it. Each data object may have a piece of data appended to it (e.g., an EOF marker) that indicates to the reader when to stop reading the data object. A similar piece of data may be prepended (e.g., a BOF marker) to the data object. The process 330 then concludes.

Pruning Data

Consider the example of a client for which a storage operation job was performed on Jan. 1, 2008, resulting in the creation of an archive file. A retention policy provides that the archive file has to be retained for 30 days. On Jan. 31, 2008, the archive file becomes prunable and thus can be deleted. Deleting the archive file may require deleting data stored in one or more chunks on one or more media. However, the archive file may not be able to be deleted if it is referenced by data objects within other archive files. This is to avoid orphaning data objects, e.g., by deleting a data object when it is still referenced in another archive file. The system keeps tracks of references to data objects in order to avoid orphaning data objects.

To assist in pruning, the single instance database 105 maintains a primary table and a secondary table. The primary table contains all the single instance records of all data objects for which an identifier was created. For each record in the primary table, the secondary table contains a record that may reference the record in the primary table.

FIGS. 9A and 9B illustrate example primary and secondary tables 900, 950. The primary table 900 has a primary record ID column 910 which may contain primary keys, a file ID column 920 that contains an identifier of a file or data object (e.g., the identifier of the file or data object), and a location column 930 which contains the location of the file or data object (e.g., the archive file ID and its offset within the archive file). The primary table 900 may also contain other columns (not shown).

The secondary table 950 has a secondary record ID column 960 which may contain primary keys, an archive file ID column 965 that contains the archive file ID, a file column 970 that contains the same identifier of the file or data object as in the primary table 900, and a reference$_{IN}$ column 975 that contains an identifier (in the form of an archive file ID and an offset) of a file or data object that references the archive file. The secondary table 950 also has a reference$_{OUT}$ column 980 that contains an identifier (in the form of an archive file ID and an offset) of a referenced file or data object. The secondary table 950 may also contain other columns (not shown).

FIG. 4 is a flow diagram illustrating a process 400 for pruning a single instance database 105 by pruning or deleting data objects stored in archive files, or entire archive files. As previously noted, archive files can be thought of as containers of data objects. The process 400 begins at step 405 where a selection of an archive file to be pruned is made. This selection can be made manually, such as by an administrator, or automatically, such as by the archive file aging out of a retention policy. At step 410, the media agent 104 performs a lookup of the archive file in the primary 900 and secondary 950 tables. At step 415, the media agent 104 determines if the archive file has references out (e.g., to other archive files).

If the archive file has references out, the process 400 continues to step 420, where the references out are deleted. At step 425, the media agent 104 determines if the archive files referenced by the references out have other references in. If there are no other references in, at step 430, the media agent 104 prunes the archive files referenced by the references out.

If the archive file does not have any references out (step 415), or if it does, and if the archive files referenced by the references out have other references in (step 425), the process 400 continues at step 435. At this step, the media agent 104 determines if the archive file has references in. If it does have references in, this means the archive file cannot be pruned. The process continues at step 440, where the media agent 104 deletes the references in. At step 445 the media agent adds a reference to the archive file to a deleted archive file table (discussed below).

If the archive file does not have any references in (step 435), the media agent 104 prunes the archive file. The media agent 104 then creates an entry in the deleted archive file table for the pruned archive file (if there wasn't already an entry) and adds a deleted timestamp to the entry. If there is already an entry for the pruned archive file, the media agent 104 adds a deleted timestamp to the entry.

FIG. 10 illustrates an example deleted archive file table 1000. The deleted archive file table 1000 has a primary record ID column 1010 which may contain primary keys, an archive file ID column 1020 that contains an identifier of the archive file, a reference$_{IN}$ column 1030 that contains an identifier (in the form of an archive file ID and an offset) of a file or data object that references the archive file, and a deleted timestamp column 1040 that contains a timestamp indicating when the archive file was deleted. In the case of an archive file that has not yet been deleted, the timestamp deleted column would be empty or null in the archive file's entry.

The process 400 will now be explained using the examples of the records shown in the primary and secondary tables 900, 950. At time $T_1$, the process 400 begins. At step 405, the media agent 104 receives a selection of $AF_1$ to prune. At step 410 the media agent 104 looks up $AF_1$, in the primary 900 and secondary 950 tables. At step 415, the media agent 104 determines that $AF_1$ has a reference out, shown by entry 994 in the secondary table 950. (Entry 992 is shown in the secondary table 950 with strikethrough to indicate that it was previously deleted during an operation to prune $AF_0$.) At step 420 the media agent deletes this reference out by deleting entry 994 from the secondary table 950. At step 425 the media agent 104 determines if $AF_0$ has any other references in. Since the only reference in for $AF_0$ is from $AF_1$ (which is to be pruned), $AF_0$ does not have any other references in. At step 430 the media agent 104 then prunes $AF_0$ and adds a timestamp indicating that $AF_0$ was pruned at time $T_1$ at entry 1052 of the deleted archive file table 1000.

At step 435 the media agent 104 determines if $AF_1$ has any references in. $AF_1$ has a reference in from $AF_3$, shown in entry 996 of the secondary table 950. The media agent thus cannot prune $AF_1$. At step 440, the media agent deletes the references in to $AF_1$ by deleting entry 996 from the secondary table 950. At step 445, the media agent adds entry 1054 to the deleted archive file table 1000, leaving the deleted timestamp blank. The blank timestamp indicates that $AF_1$ should be pruned. The process 400 then concludes.

At time $T_2$, the process 400 begins anew. At step 405, the media agent 104 receives a selection of $AF_3$ to prune. At step 410 the media agent 104 looks up $AF_3$, in the primary 900 and secondary 950 tables. At step 415, the media agent 104 determines that $AF_3$ has a reference out, shown by entry 998 in the secondary table 950, that references $AF_1$. At step 420 the media agent deletes entry 998 from the secondary table 950. At step 425 the media agent 104 determines if $AF_1$ has any other references in. Since the only reference in for $AF_1$ is from $AF_3$ (which is to be pruned), $AF_1$ does not have any other references in, and can now be pruned. At step 430 the media agent 104 then prunes $AF_1$ and adds a timestamp indicating that $AF_1$ was pruned at time $T_2$ at entry 1054 of the deleted archive file table 1000. This entry now indicates that $AF_1$ has been pruned at time $T_2$.

At step 435, the media agent 104 determines if $AF_3$ has any references in. $AF_3$ has no references in listed in the secondary table 950. The media agent thus can prune $AF_3$. At step 450, the media agent 104 prunes $AF_3$. At step 455, the media agent 104 adds the entry 1056 to the deleted archive file table 1000 with a deleted timestamp as $T_2$. The process 400 then concludes.

The pruning process 400 thus enables the system to maximize available storage space for storing archive files by storing them efficiently and then deleting or pruning them when it is no longer necessary to store them. The pruning process 400 may have additional or fewer steps than the ones described, or their order may vary other than what is described. For example, instead of the media agent adding a timestamp to an entry in the deleted archive file table 1000 to indicate when the archive file was pruned, the media agent may simply delete the entry from the deleted archive file table 1000. As another example, entries in the primary table 900 may also be deleted when the corresponding archive files are deleted. Those of skill in the art will understand that other variations are of course possible.

FIG. 14 is a flow diagram of another process 1400 for pruning data that may be employed in some examples. The process 1400 is described as being performed by the media agent 104, although those of skill in the art will understand that aspects of the process 1400 may be performed by any of the entities described herein. The process 1400 begins when the media agent 104 receives instructions to prune data corresponding to a storage operation (job). Additionally or alternatively, one or more files can be selected to be pruned, and/or one or more data blocks can be selected to be pruned. This selection of a job or other data to be deleted can be made manually, such as by an administrator, or automatically, such as by the job, files, and/or data blocks aging out by a retention policy.

As previously noted, the data structures illustrated in FIG. 13 may have been created as a result of two jobs involving two clients 102. For example, a first job on a first client 102 could result in the creation of the first chunk folder 1304, and a second job on a second client 102 could result in the creation of the second chunk folder 1305. The process 1400 is described using this example. More specifically, the process 1400 is described below as pruning the data created as a result of the first job. Of course, a similar process may be used to delete other jobs, or even smaller increments of data or data objects, such as individual files or blocks.

At step 1407 the media agent 104 determines the file, e.g., archive file, and the volume folders 1302 and chunk folder 1304 corresponding to the job to be pruned. The media agent 104 may do so, for example, by analyzing various data structures to determine this information. At step 1410 the media agent 104 deletes the metadata file 1306 and the metadata index file 1308 in the chunk folder 1304. The media agent 104 can delete the metadata file 1306 and the metadata index file 1308 in this example because these files include data, which is not referenced by any other data.

At step 1415 the media agent 104 accesses the container file 1310 and the container index file 1312 in the chunk folder 1304. The media agent 104 begins iterating through the data blocks in the container files 1310. At step 1420, beginning with a first block in the container file 1310, the media agent 104 accesses the primary table 1200 in the single instance database 105. The media agent 104 determines from the primary table 1200 whether the reference count of a data block in the container file 1310 is equal to zero. If so, this indicates that there are no references to the data block. The process 1400 then continues at step 1425, where the media agent 104 sets the entry in the container index file 1312 corresponding to the data block equal to zero, thus indicating that there are no references to the data block, and therefore prunable.

If the reference count of a data block is not equal to zero, then the data block is not prunable, and the process 1400 continues at step 1430. At this step, the media agent 104 determines whether there are more data blocks in the container file 1310. If so, the process 1400 returns to step 1420, where it accesses the next data block. If there are no more data blocks in the container file 1310, the process 1400 continues at step 1432, where the media agent 104 determines whether all the entries in the container index file 1312 corresponding to the container file 1310 are equal to zero. As illustrated in FIG. 13, the second index entry in the container index file 1312 is not equal to zero, thus indicating that the corresponding block in container file 1310 is referenced (by data in the chunk folder 1305, as earlier described). Accordingly, the container file 1310 cannot be deleted.

However, if the container file 1310 did not contain any referenced data blocks, then at step 1433, the media agent 104 would delete the container file 1310. The process would then continue at step 1435, where the media agent 104 determines whether there are more container files. According to the example as illustrated in FIG. 13, there is an additional container file 1311. The process 1400 then returns to step 1415, where it performs the same steps 1420-1433 for container file 1311. As a result of performing these steps, the media agent 104 would also determine that the container file 1311 cannot be deleted, because it contains a data block that is referenced (by data in the chunk folder 1305, as earlier described).

After processing container files 1310/1311, the process 1400 continues at step 1440, where the media agent 104 determines whether to free up storage space in the container files 1310/1311. The media agent 104 may do so using various techniques. For example, if the operating system of the media agent 104 supports sparse files, then the media agent 104 may free up space by zeroing out the bytes in the container files corresponding to the space to be freed up. For a number of contiguous blocks (e.g., a threshold number of contiguous blocks, such as three contiguous blocks) for which the corresponding entries in the container index file 1312 indicate that the blocks are not being referred to, then the media agent 104 may mark these portions of the container files 1310/1311 as available for storage by the operating system or the file system. The media agent 104 may do so by calling an API of the operating system to mark the unreferenced portions of the container files 1310/1311 as available for storage.

The media agent 104 may use certain optimizations to manage the number of times portions of the container file are marked as available for storage, such as only zeroing out bytes in container files when a threshold number of unreferenced contiguous blocks is reached (e.g., three unreferenced contiguous blocks). These optimizations may result in less overhead for the operating system because it reduces the number of contiguous ranges of zero-value bytes in the container files 1310/1311 that the operating system must keep track of (e.g., it reduces the amount of metadata about portions of the container files 1310/1311 that are available for storage).

If the operating system of the media agent 104 does not support sparse files, then the media agent 104 may free up space by truncating either the beginning or the end of the container files 1310/1311 (removing or deleting data at the beginning or end of the container files 1310/1311). The media agent 104 may do so by calling an API of the operating system, or by operating directly on the container files 1310/1311. For example, if a certain number of the last blocks of the container file are not being referred to, the media agent 104 may truncate these portions of the container files 1310/1311. Other techniques may be used to free up space in the container files 1310/1311 for storage of other data. At step 1445 the media agent 104 frees up space in the container files 1310/1311. The process 1400 then concludes.

As a result of the process 1400, the chunk folder 1304 would contain only the container files 1310/1311 and the container index file 1312. At a later time, when the chunk folder 1305 is pruned (the job that created this chunk folder is selected to be pruned), then the container files 1310/1311 in the chunk folder 1304 can be deleted, because they no longer contain data blocks that is referenced by other data. Therefore, pruning data corresponding to a job may also result in pruning data corresponding to an earlier job, because the data corresponding to the earlier job is no longer referenced by the later job.

Although the process 1400 is described with reference to the pruning of data corresponding to jobs (one or more storage operations), other data can also be pruned. For example, an administrator may wish to delete SI data but retain non-SI data. In such case, the administrator may instruct the media agent 104 to delete the container files 1310/1311/1313 but retain the metadata files 1306/1307 and metadata index files 1308/1309. As another example, an administrator or storage policy may delete one or more specific files. In such case, the media agent 104 deletes the data blocks in the container files 1310/1311/1313 corresponding to the specific files but retains other data blocks. The process 1400 may include fewer or more steps than those described herein to accommodate these other pruning examples. Those of skill in the art will understand that data can be pruned in various fashions and therefore, that the process 1400 is not limited to the steps described herein.

One advantage of the process 1400 and the techniques described herein is that they enable the deletion of data on the storage devices 103 that no longer needs to be stored while still retaining data that needs to be stored, and doing so in a space-efficient manner. Space previously allocated for data blocks that no longer need to be stored can be reclaimed by the data storage system, and used to store other data. Accordingly, the techniques described herein provide for efficient use of available storage space (available on physical media).

Suitable System

The above system may be incorporated within a data storage system and may be subjected to a data stream during a data copy operation. Referring to FIG. 5, a block diagram illustrating components of a data stream 510 utilized by a suitable data storage and recovery system is shown. The data stream 510 may include client 102, a media agent 512, and a secondary storage device, such as VTL 103. For example, in storage operations, the system may store, receive, and/or prepare data to be stored, copied, or backed up at a server or client. The system may then transfer the data to be stored to media agent 512, which may then refer to storage policies, schedule policies, and/retention policies (and other policies) to choose a secondary storage device. The media agent 512 may include or be associated with an intermediate component, to be discussed herein.

The secondary storage device receives the data from the media agent 512 and stores the data as a secondary copy, such as a backup copy. Secondary storage devices may be magnetic tapes, optical disks, USB and other similar media, disk, and tape drives, and so on. Of course, the system may employ other configurations of data stream components not shown in FIG. 6.

FIG. 6 illustrates an example of one arrangement of resources in a computing network, comprising a data storage system 650. The resources in the data storage system 650 may employ the processes and techniques described herein. The system 650 includes a storage manager 605, one or more data agents 695, one or more secondary storage computing devices 665, one or more storage devices 615, one or more computing devices 630 (called clients 630), one or more data or information stores 660 and 662, a single instancing database 623, an index 611, a jobs agent 620, an interface agent 625, and a management agent 631. The system 650 may represent a modular storage system such as the CommVault QiNetix system, and also the CommVault GALAXY backup system, available from CommVault Systems, Inc. of Oceanport, N.J., aspects of which are further described in the commonly-assigned U.S. patent application Ser. No. 09/610,738, now U.S. Pat. No. 7,035,880, the entirety of which is incorporated by reference herein. The system 650 may also represent a modular storage system such as the CommVault Simpana system, also available from CommVault Systems, Inc.

The system 650 may generally include combinations of hardware and software components associated with performing storage operations on electronic data. Storage operations include copying, backing up, creating, storing, retrieving, and/or migrating primary storage data (e.g., data stores 660 and/or 662) and secondary storage data (which may include, for example, snapshot copies, backup copies, hierarchical storage management (HSM) copies, archive copies, and other types of copies of electronic data stored on storage devices 615). The system 650 may provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In one example, storage operations may be performed according to various storage preferences, for example, as expressed by a user preference, a storage policy, a schedule policy, and/or a retention policy. A "storage policy" is generally a data structure or other information source that includes a set of preferences and other storage criteria associated with performing a storage operation. The preferences and storage criteria may include, but are not limited to, a storage location, relationships between system components, network pathways to utilize in a storage operation, data characteristics, compression or encryption requirements, preferred system components to utilize in a storage operation, a single instancing or variable instancing policy to apply to the data, and/or other criteria relating to a storage operation. For example, a storage policy may indicate that certain data is to be stored in the storage device 615, retained for a specified period of time before being aged to another tier of secondary storage, copied to the storage device 615 using a specified number of data streams, etc.

A "schedule policy" may specify a frequency with which to perform storage operations and a window of time within which to perform them. For example, a schedule policy may specify that a storage operation is to be performed every Saturday morning from 2:00 a.m. to 4:00 a.m. In some cases, the storage policy includes information generally specified by the schedule policy. (Put another way, the storage policy includes the schedule policy.) A "retention policy" may specify how long data is to be retained at specific tiers of storage or what criteria must be met before data may be pruned or moved from one tier of storage to another tier of storage. Storage policies, schedule policies and/or retention policies may be stored in a database of the storage manager 605, to archive media as metadata for use in restore operations or other storage operations, or to other locations or components of the system 650.

The system 650 may comprise a storage operation cell that is one of multiple storage operation cells arranged in a hierarchy or other organization. Storage operation cells may be related to backup cells and provide some or all of the functionality of backup cells as described in the assignee's U.S. patent application Ser. No. 09/354,058, now U.S. Pat. No. 7,395,282, which is incorporated herein by reference in its entirety. However, storage operation cells may also perform additional types of storage operations and other types of storage management functions that are not generally offered by backup cells.

Storage operation cells may contain not only physical devices, but also may represent logical concepts, organizations, and hierarchies. For example, a first storage operation cell may be configured to perform a first type of storage operations such as HSM operations, which may include backup or other types of data migration, and may include a variety of physical components including a storage manager 605 (or management agent 631), a secondary storage computing device 665, a client 630, and other components as described herein. A second storage operation cell may contain the same or similar physical components; however, it may be configured to perform a second type of storage operations, such as storage resource management (SRM) operations, and may include monitoring a primary data copy or performing other known SRM operations.

Thus, as can be seen from the above, although the first and second storage operation cells are logically distinct entities configured to perform different management functions (i.e., HSM and SRM, respectively), each storage operation cell may contain the same or similar physical devices. Alternatively, different storage operation cells may contain some of the same physical devices and not others. For example, a storage operation cell configured to perform SRM tasks may contain a secondary storage computing device 665, client 630, or other network device connected to a primary storage volume, while a storage operation cell configured to perform HSM tasks may instead include a secondary storage computing device 665, client 630, or other network device connected to a secondary storage volume and not contain the elements or components associated with and including the primary storage volume. (The term "connected" as used herein does not necessarily require a physical connection; rather, it could refer to two devices that are operably coupled to each other, communicably coupled to each other, in communication with each other, or more generally, refer to the capability of two devices to communicate with each other.) These two storage operation cells, however, may each include a different storage manager 605 that coordinates storage operations via the same secondary storage computing devices 665 and storage devices 615. This "overlapping" configuration allows storage resources to be accessed by more than one storage manager 605, such that multiple paths exist to each storage device 615 facilitating failover, load balancing, and promoting robust data access via alternative routes.

Alternatively or additionally, the same storage manager 605 may control two or more storage operation cells (whether or not each storage operation cell has its own dedicated storage manager 605). Moreover, in certain embodiments, the extent or type of overlap may be user-defined (through a control console) or may be automatically configured to optimize data storage and/or retrieval.

Data agent 695 may be a software module or part of a software module that is generally responsible for performing storage operations on the data of the client 630 stored in data store 660/662 or other memory location. Each client 630 may have at least one data agent 695 and the system 650 can support multiple clients 630. Data agent 695 may be distributed between client 630 and storage manager 605 (and any other intermediate components), or it may be deployed from a remote location or its functions approximated by a remote process that performs some or all of the functions of data agent 695.

The overall system 650 may employ multiple data agents 695, each of which may perform storage operations on data associated with a different application. For example, different individual data agents 695 may be designed to handle Microsoft Exchange data, Lotus Notes data, Microsoft Windows 2000 file system data, Microsoft Active Directory Objects data, and other types of data known in the art. Other embodiments may employ one or more generic data agents 695 that can handle and process multiple data types rather than using the specialized data agents described above.

If a client 630 has two or more types of data, one data agent 695 may be required for each data type to perform storage operations on the data of the client 630. For example, to back up, migrate, and restore all the data on a Microsoft Exchange 2000 server, the client 630 may use one Microsoft Exchange 2000 Mailbox data agent 695 to back up the Exchange 2000 mailboxes, one Microsoft Exchange 2000 Database data agent 695 to back up the Exchange 2000 databases, one Microsoft Exchange 2000 Public Folder data agent 695 to back up the Exchange 2000 Public Folders, and one Microsoft Windows 2000 File System data agent 695 to back up the file system of the client 630. These data agents 695 would be treated as four separate data agents 695 by the system even though they reside on the same client 630.

Alternatively, the overall system 650 may use one or more generic data agents 695, each of which may be capable of handling two or more data types. For example, one generic data agent 695 may be used to back up, migrate and restore Microsoft Exchange 2000 Mailbox data and Microsoft Exchange 2000 Database data while another generic data agent 695 may handle Microsoft Exchange 2000 Public Folder data and Microsoft Windows 2000 File System data, etc.

Data agents 695 may be responsible for arranging or packing data to be copied or migrated into a certain format such as an archive file. Nonetheless, it will be understood that this represents only one example, and any suitable packing or containerization technique or transfer methodology may be used if desired. Such an archive file may include metadata, a list of files or data objects copied, the file, and data objects themselves. Moreover, any data moved by the data agents may be tracked within the system by updating indexes associated with appropriate storage managers 605 or secondary storage computing devices 665. As used herein, a file or a data object refers to any collection or grouping of bytes of data that can be viewed as one or more logical units.

Generally speaking, storage manager 605 may be a software module or other application that coordinates and controls storage operations performed by the system 650. Storage manager 605 may communicate with some or all elements of the system 650, including clients 630, data agents 695, secondary storage computing devices 665, and storage devices 615, to initiate and manage storage operations (e.g., backups, migrations, data recovery operations, etc.).

Storage manager 605 may include a jobs agent 620 that monitors the status of some or all storage operations previously performed, currently being performed, or scheduled to be performed by the system 650. (One or more storage operations are alternatively referred to herein as a "job" or "jobs.") Jobs agent 620 may be communicatively coupled to an interface agent 625 (e.g., a software module or application). Interface agent 625 may include information processing and display software, such as a graphical user interface ("GUI"), an application programming interface ("API"), or other interactive interface through which users and system processes can retrieve information about the status of storage operations. For example, in an arrangement of multiple storage operations cell, through interface agent 625, users may optionally issue instructions to various storage operation cells regarding performance of the storage operations as described and contemplated herein. For example, a user may modify a schedule concerning the number of pending snapshot copies or other types of copies scheduled as needed to suit particular needs or requirements. As another example, a user may employ the GUI to view the status of pending storage operations in some or all of the storage operation cells in a given network or to monitor the status of certain components in a particular storage operation cell (e.g., the amount of storage capacity left in a particular storage device 615).

Storage manager 605 may also include a management agent 631 that is typically implemented as a software module or application program. In general, management agent 631 provides an interface that allows various management agents 631 in other storage operation cells to communicate with one another. For example, assume a certain network configuration includes multiple storage operation cells hierarchically arranged or otherwise logically related in a WAN or LAN configuration. With this arrangement, each storage operation cell may be connected to the other through each respective interface agent 625. This allows each storage operation cell to send and receive certain pertinent information from other storage operation cells, including status information, routing information, information regarding capacity and utilization, etc. These communications paths may also be used to convey information and instructions regarding storage operations.

For example, a management agent 631 in a first storage operation cell may communicate with a management agent 631 in a second storage operation cell regarding the status of storage operations in the second storage operation cell. Another illustrative example includes the case where a management agent 631 in a first storage operation cell communicates with a management agent 631 in a second storage operation cell to control storage manager 605 (and other components) of the second storage operation cell via management agent 631 contained in storage manager 605.

Another illustrative example is the case where management agent 631 in a first storage operation cell communicates directly with and controls the components in a second storage operation cell and bypasses the storage manager 605 in the second storage operation cell. If desired, storage operation cells can also be organized hierarchically such that hierarchically superior cells control or pass information to hierarchically subordinate cells or vice versa.

Storage manager 605 may also maintain an index, a database, or other data structure 611. The data stored in database 611 may be used to indicate logical associations between components of the system, user preferences, management tasks, media containerization and data storage information or other useful data. For example, the storage manager 605 may use data from database 611 to track logical associations between secondary storage computing device 665 and storage devices 615 (or movement of data as containerized from primary to secondary storage).

Generally speaking, the secondary storage computing device 665, which may also be referred to as a media agent, may be implemented as a software module that conveys data, as directed by storage manager 605, between a client 630 and one or more storage devices 615 such as a tape library, a magnetic media storage device, an optical media storage device, or any other suitable storage device. In one embodiment, secondary storage computing device 665 may be communicatively coupled to and control a storage device 615. A secondary storage computing device 665 may be considered to be associated with a particular storage device 615 if that secondary storage computing device 665 is capable of routing and storing data to that particular storage device 615.

In operation, a secondary storage computing device 665 associated with a particular storage device 615 may instruct the storage device to use a robotic arm or other retrieval means to load or eject a certain storage media, and to subsequently archive, migrate, or restore data to or from that media. Secondary storage computing device 665 may communicate with a storage device 615 via a suitable communications path such as a SCSI or Fibre Channel communications link. In some embodiments, the storage device 615 may be communicatively coupled to the storage manager 605 via a SAN.

Each secondary storage computing device 665 may maintain an index, a database, or other data structure 661 that may store index data generated during storage operations for secondary storage (SS) as described herein, including creating a metabase (MB). For example, performing storage operations on Microsoft Exchange data may generate index data. Such index data provides a secondary storage computing device 665 or other external device with a fast and efficient mechanism for locating data stored or backed up. Thus, a secondary storage computing device index 661, or a database 611 of a storage manager 605, may store data associating a client 630 with a particular secondary storage computing device 665 or storage device 615, for example, as specified in a storage policy, while a database or other data structure in secondary storage computing device 665 may indicate where specifically the data of the client 630 is stored in storage device 615, what specific files were stored, and other information associated with storage of the data of the client 630. In some embodiments, such index data may be stored along with the data backed up in a storage device 615, with an additional copy of the index data written to index cache in a secondary storage device. Thus the data is readily available for use in storage operations and other activities without having to be first retrieved from the storage device 615.

Generally speaking, information stored in cache is typically recent information that reflects certain particulars about operations that have recently occurred. After a certain period of time, this information is sent to secondary storage and tracked. This information may need to be retrieved and uploaded back into a cache or other memory in a secondary computing device before data can be retrieved from storage device 615. In some embodiments, the cached information may include information regarding format or containerization of archives or other files stored on storage device 615.

One or more of the secondary storage computing devices 665 may also maintain one or more single instance databases 623. Single instancing (alternatively called data deduplication) generally refers to storing in secondary storage only a single instance of each data object (or data block) in a set of data (e.g., primary data). More details as to single instancing may be found in one or more of the following commonly-assigned U.S. patent applications: 1) U.S. patent application Ser. No. 11/269,512 (entitled SYSTEM AND METHOD TO SUPPORT SINGLE INSTANCE STORAGE OPERATIONS, 2) U.S. patent application Ser. No. 12/145,347 (entitled APPLICATION-AWARE AND REMOTE SINGLE INSTANCE DATA MANAGEMENT, or 3) U.S. patent application Ser. No. 12/145,342 (entitled APPLICATION-AWARE AND REMOTE SINGLE INSTANCE DATA MANAGEMENT, 4) U.S. patent application Ser. No. 11/963,623 (entitled SYSTEM AND METHOD FOR STORING REDUNDANT INFORMATION, and 5) U.S. patent application Ser. No. 11/950,376 (entitled SYSTEMS AND METHODS FOR CREATING COPIES OF DATA SUCH AS ARCHIVE COPIES, each of which is incorporated by reference herein in its entirety.

In some examples, the secondary storage computing devices 665 maintain one or more variable instance databases. Variable instancing generally refers to storing in secondary storage one or more instances, but fewer than the total number of instances, of each data block (or data object) in a set of data (e.g., primary data). More details as to variable instancing may be found in the commonly-assigned U.S. Pat. App. No. 61/164,803 (entitled STORING A VARIABLE NUMBER OF INSTANCES OF DATA OBJECTS.

In some embodiments, certain components may reside and execute on the same computer. For example, in some embodiments, a client 630 such as a data agent 695, or a storage manager 605, coordinates and directs local archiving, migration, and retrieval application functions as further described in the previously-referenced U.S. patent application Ser. No. 09/610,738. This client 630 can function independently or together with other similar clients 630.

As shown in FIG. 6, secondary storage computing devices 665 each has its own associated metabase 661. Each client 630 may also have its own associated metabase 670. However in some embodiments, each "tier" of storage, such as primary storage, secondary storage, tertiary storage, etc., may have multiple metabases or a centralized metabase, as described herein. For example, rather than a separate metabase or index associated with each client 630 in FIG. 6, the metabases on this storage tier may be centralized. Similarly, second and other tiers of storage may have either centralized or distributed metabases. Moreover, mixed architecture systems may be used if desired, that may include a first tier centralized metabase system coupled to a second tier storage system having distributed metabases and vice versa, etc.

Moreover, in operation, a storage manager 605 or other management module may keep track of certain information that allows the storage manager 605 to select, designate, or otherwise identify metabases to be searched in response to certain queries as further described herein. Movement of data between primary and secondary storage may also involve movement of associated metadata and other tracking information as further described herein.

In some examples, primary data may be organized into one or more sub-clients. A sub-client is a portion of the data of one or more clients 630, and can contain either all of the data of the clients 630 or a designated subset thereof. As depicted in FIG. 6, the data store 662 includes two sub-clients. For example, an administrator (or other user with the appropriate permissions; the term administrator is used herein for brevity) may find it preferable to separate email data from financial data using two different sub-clients having different storage preferences, retention criteria, etc.

Referring to FIG. 7, a block diagram illustrating an example of components of a server or system 700 used in data storage operations is shown. A server, such as storage manager 605, may communicate with clients 630 to determine data to be copied to storage media. As described above, the storage manager 605 may contain a jobs agent 620, a management agent 631, a database 611, an interface module 625, and/or other agents 720. Jobs agent 620 may manage and control the scheduling of jobs (such as copying data files) from clients 130 to media agents 512 (not shown). Management agent 631 may control the overall functionality and processes of the data storage system or may communicate with global managers. Database 611 or another data structure may store storage policies, schedule policies, retention policies, or other information, such as historical storage statistics, storage trend statistics, and so on. Interface module 625 may interact with a user interface, enabling the system to present information to administrators and receive feedback or other input from the administrators or with other components of the system (such as via APIs).

Block Level Single Instancing

Instead of single instancing files or data objects, single instancing can be performed on a block level. Files can be broken into blocks and transmitted using the techniques described herein. The blocks are typically fixed sizes, e.g., 64 Kb. An identifier is created for each block, and a lookup of the identifier is performed in the single instance database 105 to see if it has already been stored. If it has not, then the block can be stored. If it has, a reference to the block can be stored, using the techniques described herein.

For example, a data storage system may include multiple computing devices (e.g., client computing devices) that store primary data (e.g., production data such as system files, user files, etc.). The data storage system may also include a secondary storage computing device, a single instance database, and one or more storage devices that store copies of the primary data (e.g., secondary copies, tertiary copies, etc.). The secondary storage computing device receives blocks of data from the computing devices and accesses the single instance database to determine whether the blocks of data are unique (unique meaning that no instances of the blocks of data are already stored on the storage devices). If a block of data is unique, the single instance database stores it in a file on a storage device. If not, the secondary storage computing device can avoid storing the block of data on the storage devices.

The primary data of the computing devices can be divided into data that is eligible for single instancing and data that is not eligible for single instancing. An example of the latter is metadata (e.g., Master File Table information) and an example of the former is data (e.g., operating system and/or application files). A file typically comprises one or more blocks as tracked by the file systems of the computing devices.

The computing devices align data that is eligible for single instancing into blocks of data (which may comprise one or more blocks as tracked by the file systems of the computing devices) and generate identifiers for the blocks of data that the secondary storage computing device uses to determine if the blocks of data are unique. This allows the secondary storage computing device to avoid generating identifiers for the blocks of data, which may be computationally expensive and/or require a long time to perform. Therefore, distributed identifier generation apportions potentially lengthy operations across numerous computing devices, thereby freeing up the secondary storage computing device to perform other operations (e.g., storing data, retrieving data, pruning data, etc.).

The computing devices send the blocks of data and other data (e.g., metadata and/or the data that is not eligible for single instancing) in a data stream to the secondary storage computing device. The secondary storage computing device receives the data stream and stores blocks of data and their identifiers in buffers in random access memory (RAM). The secondary storage computing device determines whether a block of data is already stored on a storage device. To do this, the secondary storage computing device determines, by analyzing data structures in the single instance database in view of the block's identifier, whether the block of data is already stored on a storage device. If it is, then the secondary storage computing device 1) stores a link to the already stored block of data in a metadata file and 2) discards the block of data from the memory buffer. If it is not, then the secondary storage computing device stores the block of data in a container file.

Because the size of a block of data and associated metadata is typically less then the size of a memory buffer, the secondary storage computing device can keep a single block of data in a single memory buffer while it looks up its identifier in the single instance database. This allows the secondary storage computing device to avoid writing the block of data to disk (an operation which is typically slower than storing the block of data in a RAM buffer) until the secondary storage computing device determines that it needs to store the block of data in a container file on a storage device. The secondary storage computing device stores data that is not eligible for single instancing in metadata files.

By storing multiple blocks of data in a single container file, the secondary storage computing device avoids storing each block of data as a separate file on the file systems of the storage devices. This reduces the number of files that would be stored on the file systems of the storage devices, thereby ensuring that the storage devices can adequately store the data of the computing devices in the data storage system.

One advantage of these techniques is that they significantly reduce the number of files stored on a file system of a computing device or storage device. This is at least partly due to the storage of data blocks within the container files. Even if the secondary storage computing device performs numerous storage operations, these techniques will result in storing far fewer files on the file system than storage operations where each data block is stored as a separate file. Therefore, the file system of the computing device or storage device may not necessarily have to contend with storing excessively large numbers of files, such as millions of files or more. Accordingly, these techniques enable very large numbers of blocks of data to be stored without regard to limitations of the file system of the computing device or storage device.

However, the storage of blocks of data in container files may create additional complexities when it comes time to prune or delete data. This is because a container file may contain blocks of data that are referenced by links in metadata files and thus cannot be deleted, because referenced blocks of data typically still need to be stored on the storage devices. Furthermore, because the blocks of data are not stored as files on the file systems of the storage devices, they cannot be directly referenced by the file system.

The systems and methods described herein provide solutions to these problems. The secondary storage computing device creates the container files as sparse files (typically only on operating systems that support sparse files, e.g., Windows operating systems, but also on other operating systems that support sparse files). A sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Second, the secondary storage computing device maintains a separate index that stores an indication of whether blocks of data in container files are referred to by links in metadata files. In some examples, this can be thought of as creating another file system on top of the existing file systems of the storage devices that keeps track of blocks of data in the container files.

When a block of data is not referred to and does not need to be stored, the secondary storage computing device can prune it. To prune data, the secondary storage computing device accesses the separate index to determine the blocks of data that are not referred to by links. On operating systems that support sparse files, the secondary storage computing device can free up space in the container files corresponding to those blocks of data by marking the portions of the physical media corresponding to the unreferenced portions of the container file as available for storage (e.g., by zeroing out the corresponding bytes in the container files). On operating systems that do not support sparse files, the secondary storage computing device can free up space in the container files by truncating the extreme portions of the container files (e.g., the beginnings and/or the ends of the container files), thereby making the corresponding portions of the physical media available to store other data. Freeing up space in container files allows the operating system to utilize the freed-up space in other fashions (e.g., other programs may utilize the freed-up space).

Siloing a Single Instance Store

The combination of the data stored on the storage device 103 and the single instance database 105 can be termed a "single instance store." Siloing a single instance store refers to moving all the information stored in the single instance store to secondary storage, such as to tape, to create a silo of a single instance store. When this occurs, a new single instance store, comprising a new single instance database 105 and a new data structure (e.g., a new collection of one or more chunk folders 202) on the storage device 103 is created. When this occurs, single instancing of data objects essentially starts over from the beginning.

This process can be repeated on a periodic or ad hoc basis to create multiple silos of single instance stores. Consider the following example. A single instance store can be siloed every 15 days. Starting at day 1, secondary copies of numerous data objects can be created on the storage device 103 using the techniques described herein. These data objects can be backed up to tape and the tapes sent offsite for storage (although the tapes are described as being sent offsite, they may not be sent offsite). On day 2, any incremental changes to the data objects would be picked up and copied over to the storage device 103, backed up to tape, and the tape sent offsite for storage. This continues until day 15, when the entire single instance store is backed up to tape. On day 16, a new single instance store is created at that time, and the above process would start anew. One advantage of this process is that up to 15 days worth of changes to data objects can be easily recovered.

Another advantage of this process that it may reduce the number of secondary media, such as tapes, needed to restore files. For example, the longer period of time between backups of a single instance store, the more tapes potentially could be needed to restore files. For example, a very large number of files could have references on a large number of tapes. All of the tapes would need to be mounted in order to restore all of the very large number of files. This could slow down the restore process to unacceptable levels.

Although a fifteen-day window has been described for siloing a single instance store, this window may be configurable based upon the storage needs of the implementer of the system. This window could be optimized based upon the rate of change of the data being stored. For example, if the rate of change of data is very small, then a longer siloing window can be used, because there is a lot of data being single instanced, and therefore tapes will be used at a slower rate. However, if the rate of change of data is very high, then a shorter siloing window may be necessary, because the amount of data that is being single instanced is actually very low, and therefore tapes will be used at a faster rate. This window can also be based on other factors, including tape usage, tape hardware, tape access times, numbers of restores, etc., in order to optimize the siloing window for the storage needs of the implementer of the system.

CONCLUSION

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Modules described herein may be executed by a general-purpose computer, e.g., a server computer, wireless device, or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like, are generally used interchangeably herein and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, a network, a browser, or other application in an ASP context, or via another means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Examples of the technology may be stored or distributed on computer-readable media, including magnetically or optically readable computer disks, hard-wired or preprogrammed chips (e.g., EEPROM semiconductor chips), nanotechnology memory, biological memory, or other data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C § 112, ¶6, other aspects may likewise be embodied as a means-plus-function claim, or in other forms, such as being embodied in a computer-readable medium. (Any claims intended to be treated under 35 U.S.C. § 112, ¶6, will begin with the words "means for".) Accordingly, the applicant reserves the right to add additional claims after filing the application to pursue such additional claim forms for other aspects of the invention.

We claim:

1. A method of pruning data that is performed by one or more computing systems of a data storage system, each computing system including a processor and memory, the method comprising:
  receiving an indication to delete a first archive file that stores data,
    wherein the first archive file includes a first set of data; and
    wherein the first set of data includes blocks of data;
  determining, by the one or more computing systems, if the first set of data comprises at least one reference to a second set of data included in a second archive file;
  if the first set of data comprises at least one reference to the second set of data, then:
    deleting any of the references to the second set of data referenced by the first set of data;
    determining if the second set of data is referenced by a third set of data included in a third archive file; and
    if the second set of data is not referenced by the third set of data, then deleting the second archive file;
  determining, by the one or more computing systems, if the first set of data is referenced by at least one of the third set of data and a fourth set of data included in a fourth archive file; and
  if the first set of data is referenced by at least one of the third set of data and the fourth set of data, then:
  deleting any references to the first set of data by the third set of data and any references to the first set of data by the fourth set of data; and storing an indication to delete the first archive file.

2. The method of claim 1, further comprising: if the first set of data is not referenced by either the third set of data or the fourth set of data, then deleting the first archive file.

3. The method of claim 1, further comprising: if the first set of data is not referenced by either the third set of data or the fourth set of data, then: deleting the first archive file; and storing an indication of the deletion of the first archive file.

4. The method of claim 1, further comprising: if the first set of data is not referenced by either the third set of data or the fourth set of data, then: deleting the first archive file; and if an indication to delete the first archive file was previously stored, then deleting the indication.

5. The method of claim 1, wherein the first archive file, second archive file, and third archive file, and fourth archive file are stored on one or more distinct data storage media.

6. The method of claim 1, further comprising:
  receiving an indication to delete the third archive file;
    determining if the third set of data references to the first set of data;
  if the third set of data references to the first set of data, then:
    deleting any references to the first set of data referenced by the third set of data;
  determining if the first set of data is referenced by the fourth set of data; and
  if the first set of data is not referenced by the fourth set of data, then:
  deleting the first archive file; and
  performing at least one of deleting the stored indication to delete the first archive file and storing an indication of the deletion of the first archive file;
  determining if the third set of data is referenced by at least one of the fourth set of data and a fifth set of data included in a fifth archive file; and
  if the third set of data is referenced by at least one of the fourth set of data and the fifth set of data, then:
  deleting any references to the third set of data by the fourth set of data and any references to the third set of data by the fifth set of data; and
  storing an indication to delete the third archive file.

7. The method of claim 1, wherein the indication to delete the first archive file is received at a first time and an indication to delete the third archive file is received at a second time subsequent to the first time.

8. A method of managing data that is performed by one or more computing systems of a data storage system, each computing system including a processor and memory, the method comprising:
  receiving a first indication to perform a first storage operation;
  receiving a first set of data objects involved in the first storage operation;
  for at least one of the data objects in the first set, by the one or more computing systems:
    generating an identifier that represents the data object;
    based on the generated identifier, determining whether an instance of the data object is already stored in a first data storage system; and
    if an instance of the data object has already been stored, then:
      determining a location of the instance of the data object; and
      storing a reference to the location of the instance of the data object in a first file in a directory of the first data storage system,
        wherein the first file is configured to store multiple references, and wherein each reference refers to a location of an instance of a data object; and
  if an instance of the data object is not already stored in the first data storage system, then storing the data object in a second file in the directory, wherein the second file is configured to store only a single instance of each data object;
  copying the data objects stored in the first data storage system to a second data storage system;
  receiving a second indication to perform a second storage operation;
  receiving a second set of data objects involved in the second storage operation;
  and for at least one of the data objects in the second set:
    generating an identifier that represents the data object in the second set; and
  storing the data object in the first data storage system.

9. The method of claim 8, further comprising repeating at least twice the copying of the data objects stored in the first data storage system to the second data storage system, wherein the repeating is periodic.

10. The method of claim 8, further comprising:
   determining a rate of change of data of at least some of the data objects in the first and second sets; and
   repeating at least twice the copying of the data objects stored in the first data storage system to a second data storage system,
wherein a frequency of the repeating is based upon the determined rate of change of data.

11. A method of pruning files containing data that is performed by one or more computing systems, each computing system including a processor and memory, the method comprising:
   receiving an indication to delete a first archive file, wherein the first archive file includes a first set of data;
   determining, by the one or more computing systems, if the first set of data references a second set of data included in a second archive file;
   if the first set of data references the second set of data, then:
      deleting any references to the second set of data by the first set of data;
      and deleting the second archive file;
   determining, by the one or more computing systems, if the first set of data is referenced by at least a third set of data included in a third archive file; and
   if the first set of data is referenced by at least the third set of data, then: deleting any references to the first set of data by the third set of data; and storing an indication to delete the first archive file.

12. The method of claim 11, further comprising:
   receiving an indication to delete the third archive file;
   determining if the third set of data references the first set of data;
   if the third set of data references the first set of data, then:
      deleting any references to the first set of data by the third set of data; and
      deleting the first archive file; and
   determining if the third set of data is referenced by at least a fourth set of data in a fourth archive file; and
   if the third set of data is referenced by at least the fourth set of data, then:
      deleting any to the third set of data by the fourth set of data; and
storing an indication to delete the third archive file.

13. The method of claim 11, wherein the first archive file, second archive file, and third archive file are stored on one or more distinct data storage media.

* * * * *